(12) United States Patent
Bone et al.

(10) Patent No.: US 10,302,912 B2
(45) Date of Patent: May 28, 2019

(54) OPTICAL IMAGING LENS

(71) Applicant: Genius Electronic Optical Co., Ltd., Taichung (TW)

(72) Inventors: Matthew Bone, Fujian (CN); Wenbin Lin, Fujian (CN); Xiaohui Zhang, Fujian (CN)

(73) Assignee: Genius Electronic Optical Co., Ltd., Taichung (TW)

( * ) Notice: Subject to any disclaimer, the term of this patent is extended or adjusted under 35 U.S.C. 154(b) by 0 days.

(21) Appl. No.: 15/653,508

(22) Filed: Jul. 18, 2017

(65) Prior Publication Data

US 2018/0372996 A1 Dec. 27, 2018

(30) Foreign Application Priority Data

Jun. 22, 2017 (CN) .......................... 2017 1 0478949

(51) Int. Cl.
*G02B 15/14* (2006.01)
*G02B 13/00* (2006.01)
*G02B 13/18* (2006.01)
*G02B 5/08* (2006.01)
*H04N 5/225* (2006.01)

(52) U.S. Cl.
CPC ....... *G02B 13/0045* (2013.01); *G02B 5/0841* (2013.01); *G02B 13/18* (2013.01); *G02B 13/001* (2013.01); *H04N 5/2254* (2013.01)

(58) Field of Classification Search
CPC ..................................................... G02B 7/025

USPC .......................................................... 359/713
See application file for complete search history.

(56) References Cited

U.S. PATENT DOCUMENTS 8,780,454 B2 * 7/2014 Lee ..................... G02B 15/177
359/683
2016/0187617 A1 * 6/2016 Komiyama ........ G02B 13/0045
359/713

FOREIGN PATENT DOCUMENTS

| CN | 103576294 A | 2/2014 |
| WO | 2016109956 A1 | 7/2016 |
| WO | 2017078375 A1 | 5/2017 |

* cited by examiner

*Primary Examiner* — James C. Jones
(74) *Attorney, Agent, or Firm* — Winston Hsu

(57) ABSTRACT

An optical lens set includes: a first, second, third, fourth, fifth and sixth lens element, said first lens element has negative refractive power, said second lens element has negative refractive power, said fourth lens element has an object-side surface with a convex portion in a vicinity of the optical axis, and said fifth lens element has an image-side surface with a concave portion in a vicinity of the optical axis, in addition, at least one lens element of the six lens elements disposed adjacent to an aperture stop has positive refractive power and made by glass material, except for the lens elements with glass material, other lens elements with refractive powers are plastic lens elements, the Abbe numbers of the second and the third lens element are v2 and v3 respectively, and the optical imaging lens satisfies: $|v2-v3| \le 15.000$.

19 Claims, 22 Drawing Sheets

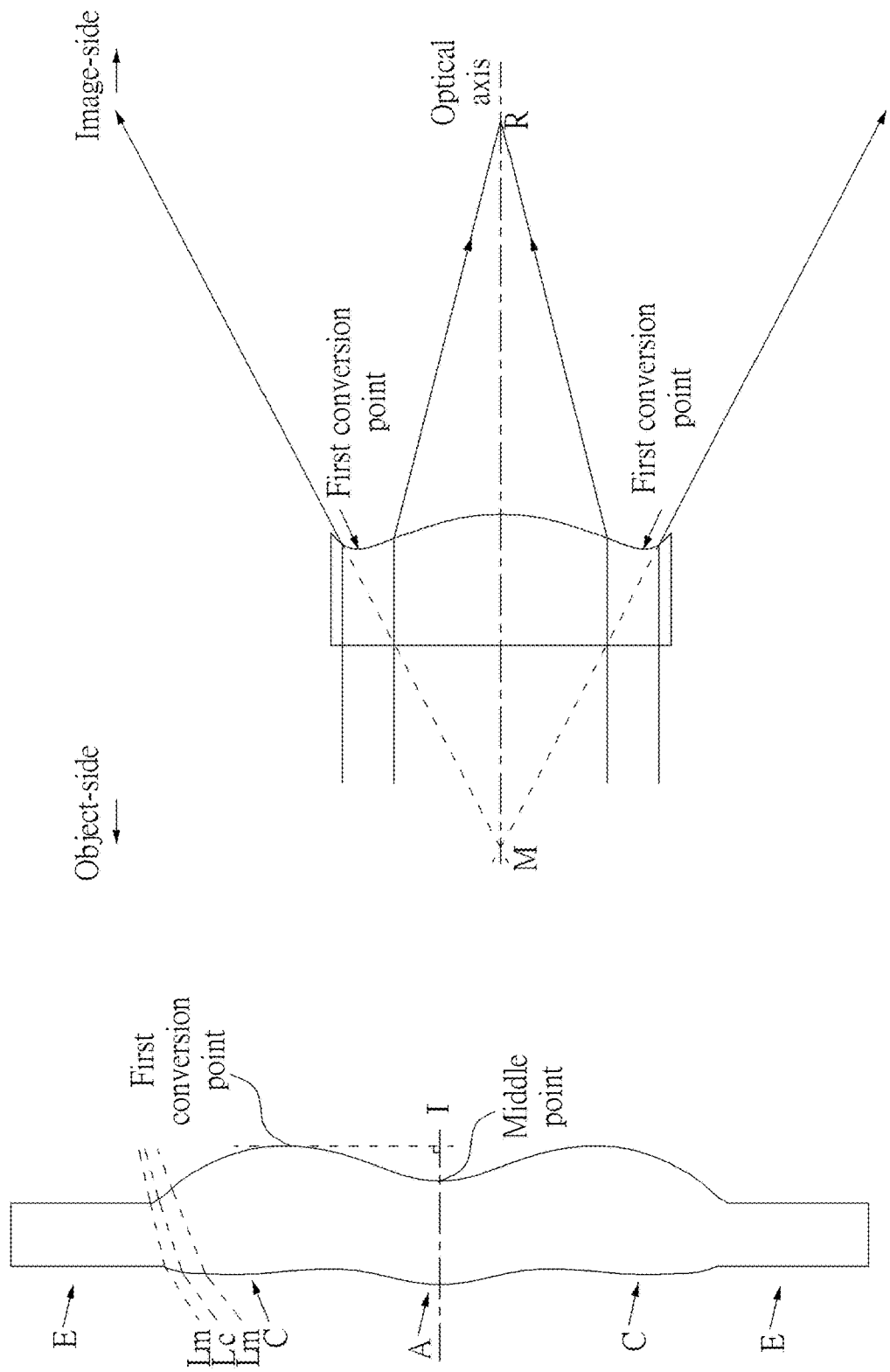

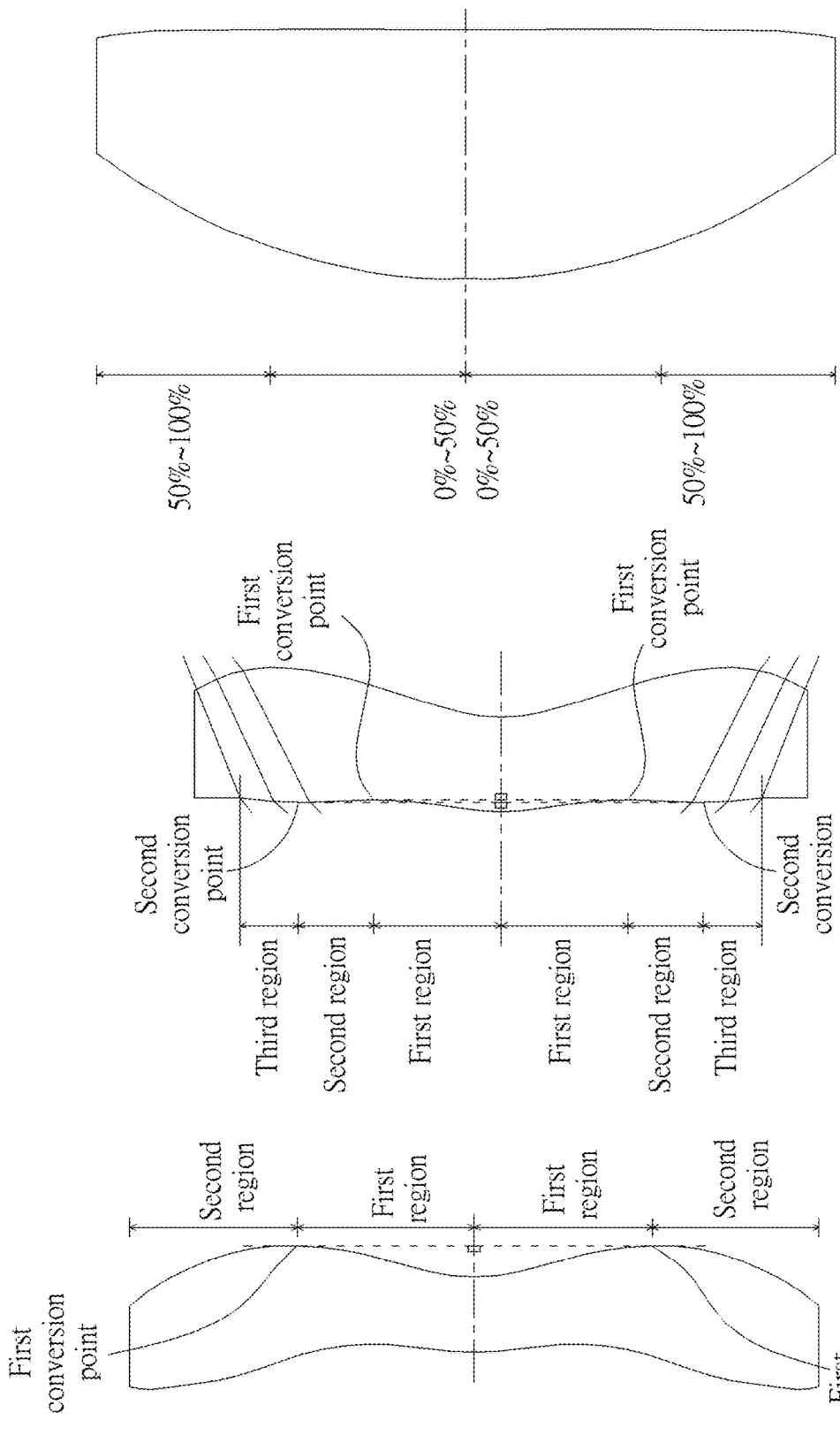

| First Example |||||||
|---|---|---|---|---|---|---|
| Image height=0.753mm; EFL=0.621 mm, HFOV= 85.019 TTL =6.732mm; Fno=2.28 |||||||
| No. | | Curvature Radius | Ape. Stop Lens Thickness Air Gap | Refractive Index | Abbe No. | Focal Length | Material |
| | Object | | Infinity | | | | |
| 11 | First Lens | 3.690 | 0.398 | T1 | 1.639 | 55.472 | -2.020 | Glass |
| 12 | | 0.906 | 0.872 | G12 | | | | |
| 21 | Second Lens | 3.327 | 0.138 | T2 | 1.535 | 55.994 | -2.833 | Plastic |
| 22 | | 1.016 | 0.345 | G23 | | | | |
| 31 | Third Lens | -18.522 | 1.819 | T3 | 1.544 | 49.922 | 2.088 | Plastic |
| 32 | | -1.094 | 0.461 | G34 | | | | |
| 80 | Ape. Stop | | 0.100 | | | | |
| 41 | Fourth Lens | 3.107 | 0.706 | T4 | 1.517 | 64.167 | 1.681 | Glass |
| 42 | | -1.092 | 0.113 | G45 | | | | |
| 51 | Fifth Lens | -6.528 | 0.250 | T5 | 1.642 | 22.409 | -1.147 | Plastic |
| 52 | | 0.813 | 0.100 | G56 | | | | |
| 61 | Sixth Lens | 0.927 | 0.494 | T6 | 1.536 | 55.794 | 1.438 | Plastic |
| 62 | | -3.436 | 0.100 | G6F | | | | |
| 70 | Filter | Infinity | 0.210 | | 1.517 | 64.167 | | |
| | | Infinity | 0.625 | | | | | |
| 71 | Image Plane | Infinity | 0.000 | | | | | |

FIG. 18

| No. | K | a2 | a4 | a6 | a8 |
|---|---|---|---|---|---|
| 11 | 0.000000E+00 | 0.000000E+00 | 0.000000E+00 | 0.000000E+00 | 0.000000E+00 |
| 12 | 0.000000E+00 | 0.000000E+00 | 0.000000E+00 | 0.000000E+00 | 0.000000E+00 |
| 21 | 0.000000E+00 | 0.000000E+00 | -2.968497E-01 | 4.261780E-02 | 6.011962E-02 |
| 22 | 0.000000E+00 | 0.000000E+00 | -1.615944E-01 | -9.748956E-02 | -3.309142E-01 |
| 31 | 0.000000E+00 | 0.000000E+00 | -1.077915E-02 | -1.652583E-01 | -2.244962E-01 |
| 32 | 0.000000E+00 | 0.000000E+00 | 1.180126E-01 | 2.967295E-02 | 4.922098E-02 |
| 41 | 0.000000E+00 | 0.000000E+00 | 0.000000E+00 | 0.000000E+00 | 0.000000E+00 |
| 42 | 0.000000E+00 | 0.000000E+00 | 0.000000E+00 | 0.000000E+00 | 0.000000E+00 |
| 51 | 0.000000E+00 | 0.000000E+00 | -6.249306E-01 | -6.946216E-01 | 0.000000E+00 |
| 52 | 0.000000E+00 | 0.000000E+00 | -7.850179E-01 | -1.382592E+00 | 0.000000E+00 |
| 61 | 0.000000E+00 | 0.000000E+00 | -4.152302E-01 | 2.939168E-01 | -1.268382E+00 |
| 62 | 0.000000E+00 | 0.000000E+00 | -5.159862E-01 | 1.292656E+00 | -4.756585E-01 |
| No. | a10 | a12 | a14 | a16 | |
| 11 | 0.000000E+00 | 0.000000E+00 | 0.000000E+00 | 0.000000E+00 | |
| 12 | 0.000000E+00 | 0.000000E+00 | 0.000000E+00 | 0.000000E+00 | |
| 21 | 0.000000E+00 | 0.000000E+00 | 0.000000E+00 | 0.000000E+00 | |
| 22 | 0.000000E+00 | 0.000000E+00 | 0.000000E+00 | 0.000000E+00 | |
| 31 | 0.000000E+00 | 0.000000E+00 | 0.000000E+00 | 0.000000E+00 | |
| 32 | 0.000000E+00 | 0.000000E+00 | 0.000000E+00 | 0.000000E+00 | |
| 41 | 0.000000E+00 | 0.000000E+00 | 0.000000E+00 | 0.000000E+00 | |
| 42 | 0.000000E+00 | 0.000000E+00 | 0.000000E+00 | 0.000000E+00 | |
| 51 | 0.000000E+00 | 0.000000E+00 | 0.000000E+00 | 0.000000E+00 | |
| 52 | 0.000000E+00 | 0.000000E+00 | 0.000000E+00 | 0.000000E+00 | |
| 61 | 0.000000E+00 | 0.000000E+00 | 0.000000E+00 | 0.000000E+00 | |
| 62 | 0.000000E+00 | 0.000000E+00 | 0.000000E+00 | 0.000000E+00 | |

FIG. 19

| Second Example |||||||||
|---|---|---|---|---|---|---|---|---|
| Image height=0.862mm; EFL=0.806 mm, HFOV= 85.190 TTL =9.568mm; Fno=2.28 |||||||||
| No. | | Curvature Radius | Ape. Stop Lens Thickness Air Gap | | Refractive Index | Abbe No. | Focal Length | Material |
| | Object | | Infinity | | | | | |
| 11 | First Lens | 11.735 | 0.549 | T1 | 1.639 | 55.472 | -2.470 | Glass |
| 12 | | 1.347 | 1.755 | G12 | | | | |
| 21 | Second Lens | -1.369 | 1.466 | T2 | 1.536 | 55.794 | -58.567 | Plastic |
| 22 | | -1.962 | 0.420 | G23 | | | | |
| 31 | Third Lens | -4.620 | 0.870 | T3 | 1.536 | 55.794 | 5.483 | Plastic |
| 32 | | -1.897 | 0.100 | G34 | | | | |
| 80 | Ape. Stop | | 0.100 | | | | | |
| 41 | Fourth Lens | 3.944 | 2.000 | T4 | 1.517 | 64.167 | 2.309 | Glass |
| 42 | | -1.391 | 0.200 | G45 | | | | |
| 51 | Fifth Lens | -1.790 | 0.120 | T5 | 1.642 | 22.409 | -1.543 | Plastic |
| 52 | | 2.123 | 0.010 | G56 | | | | |
| 61 | Sixth Lens | 1.494 | 0.650 | T6 | 1.536 | 55.794 | 1.888 | Plastic |
| 62 | | -2.552 | 0.301 | G6F | | | | |
| 70 | Filter | Infinity | 0.21 | | 1.516 | 64.167 | | |
| | | Infinity | 0.817 | | | | | |
| 71 | Image Plane | Infinity | 0.000 | | | | | |

FIG. 20

| No. | K | a2 | a4 | a6 | a8 |
|---|---|---|---|---|---|
| 11 | 0.000000E+00 | 0.000000E+00 | 0.000000E+00 | 0.000000E+00 | 0.000000E+00 |
| 12 | 0.000000E+00 | 0.000000E+00 | 0.000000E+00 | 0.000000E+00 | 0.000000E+00 |
| 21 | 0.000000E+00 | 0.000000E+00 | 2.929040E-02 | 3.702610E-02 | 1.127643E-02 |
| 22 | 0.000000E+00 | 0.000000E+00 | 3.900545E-02 | 1.699213E-02 | 4.345535E-02 |
| 31 | 0.000000E+00 | 0.000000E+00 | -4.222871E-02 | 7.644216E-03 | 9.121615E-02 |
| 32 | 0.000000E+00 | 0.000000E+00 | -1.503546E-02 | 5.036036E-03 | 4.194896E-02 |
| 41 | 0.000000E+00 | 0.000000E+00 | 0.000000E+00 | 0.000000E+00 | 0.000000E+00 |
| 42 | 0.000000E+00 | 0.000000E+00 | 0.000000E+00 | 0.000000E+00 | 0.000000E+00 |
| 51 | 0.000000E+00 | 0.000000E+00 | -8.736013E-02 | -1.587913E-01 | 0.000000E+00 |
| 52 | 0.000000E+00 | 0.000000E+00 | 1.904205E-02 | -1.569076E-01 | 0.000000E+00 |
| 61 | 0.000000E+00 | 0.000000E+00 | -9.284741E-02 | -5.309044E-02 | 9.704131E-03 |
| 62 | 0.000000E+00 | 0.000000E+00 | -1.468911E-01 | 1.867388E-02 | 5.199654E-02 |
| No. | a10 | a12 | a14 | a16 | |
| 11 | 0.000000E+00 | 0.000000E+00 | 0.000000E+00 | 0.000000E+00 | |
| 12 | 0.000000E+00 | 0.000000E+00 | 0.000000E+00 | 0.000000E+00 | |
| 21 | 0.000000E+00 | 0.000000E+00 | 0.000000E+00 | 0.000000E+00 | |
| 22 | 0.000000E+00 | 0.000000E+00 | 0.000000E+00 | 0.000000E+00 | |
| 31 | 0.000000E+00 | 0.000000E+00 | 0.000000E+00 | 0.000000E+00 | |
| 32 | 0.000000E+00 | 0.000000E+00 | 0.000000E+00 | 0.000000E+00 | |
| 41 | 0.000000E+00 | 0.000000E+00 | 0.000000E+00 | 0.000000E+00 | |
| 42 | 0.000000E+00 | 0.000000E+00 | 0.000000E+00 | 0.000000E+00 | |
| 51 | 0.000000E+00 | 0.000000E+00 | 0.000000E+00 | 0.000000E+00 | |
| 52 | 0.000000E+00 | 0.000000E+00 | 0.000000E+00 | 0.000000E+00 | |
| 61 | 0.000000E+00 | 0.000000E+00 | 0.000000E+00 | 0.000000E+00 | |
| 62 | 0.000000E+00 | 0.000000E+00 | 0.000000E+00 | 0.000000E+00 | |

FIG. 21

| Third Example |||||||||
|---|---|---|---|---|---|---|---|---|
| Image height=0.784mm; EFL=0.691 mm, HFOV= 85.046 TTL =6.691mm; Fno=2.28 |||||||||
| No. | | Curvature Radius | Ape. Stop Lens Thickness Air Gap | | Refractive Index | Abbe No. | Focal Length | Material |
| | Object | | Infinity | | | | | |
| 11 | First Lens | 10.548 | 1.019 | T1 | 1.639 | 55.472 | -3.302 | Glass |
| 12 | | 1.671 | 0.689 | G12 | | | | |
| 21 | Second Lens | -2.636 | 0.282 | T2 | 1.536 | 55.794 | -1.438 | Plastic |
| 22 | | 1.107 | 0.703 | G23 | | | | |
| 31 | Third Lens | 1.743 | 2.079 | T3 | 1.536 | 55.794 | 2.100 | Plastic |
| 32 | | -1.796 | 0.469 | G34 | | | | |
| 80 | Ape. Stop | | 0.100 | | | | | |
| 41 | Fourth Lens | 1.190 | 0.500 | T4 | 1.517 | 64.167 | 1.565 | Glass |
| 42 | | -2.076 | 0.156 | G45 | | | | |
| 51 | Fifth Lens | -1.500 | 0.201 | T5 | 1.642 | 22.409 | -1.100 | Plastic |
| 52 | | 1.324 | 0.100 | G56 | | | | |
| 61 | Sixth Lens | 1.462 | 0.326 | T6 | 1.536 | 55.794 | 1.522 | Plastic |
| 62 | | -1.651 | 0.218 | G6F | | | | |
| 70 | Filter | Infinity | 0.210 | | 1.517 | 64.167 | | |
| | | Infinity | 0.640 | | | | | |
| 71 | Image Plane | Infinity | 0.000 | | | | | |

FIG. 22

| No. | K | a2 | a4 | a6 | a8 |
|---|---|---|---|---|---|
| 11 | 0.000000E+00 | 0.000000E+00 | 0.000000E+00 | 0.000000E+00 | 0.000000E+00 |
| 12 | 0.000000E+00 | 0.000000E+00 | 0.000000E+00 | 0.000000E+00 | 0.000000E+00 |
| 21 | 0.000000E+00 | 0.000000E+00 | 2.689810E-02 | 0.000000E+00 | 0.000000E+00 |
| 22 | 0.000000E+00 | 0.000000E+00 | -6.894634E-03 | 0.000000E+00 | 0.000000E+00 |
| 31 | 0.000000E+00 | 0.000000E+00 | -5.613078E-02 | 0.000000E+00 | 0.000000E+00 |
| 32 | 0.000000E+00 | 0.000000E+00 | 3.544971E-02 | 0.000000E+00 | 0.000000E+00 |
| 41 | 0.000000E+00 | 0.000000E+00 | 0.000000E+00 | 0.000000E+00 | 0.000000E+00 |
| 42 | 0.000000E+00 | 0.000000E+00 | 0.000000E+00 | 0.000000E+00 | 0.000000E+00 |
| 51 | 0.000000E+00 | 0.000000E+00 | 0.000000E+00 | 0.000000E+00 | 0.000000E+00 |
| 52 | 0.000000E+00 | 0.000000E+00 | 0.000000E+00 | 0.000000E+00 | 0.000000E+00 |
| 61 | 0.000000E+00 | 0.000000E+00 | -1.830878E-01 | 0.000000E+00 | 0.000000E+00 |
| 62 | 0.000000E+00 | 0.000000E+00 | -2.732858E-02 | -6.507300E-02 | 0.000000E+00 |
| No. | a10 | a12 | a14 | a16 | |
| 11 | 0.000000E+00 | 0.000000E+00 | 0.000000E+00 | 0.000000E+00 | |
| 12 | 0.000000E+00 | 0.000000E+00 | 0.000000E+00 | 0.000000E+00 | |
| 21 | 0.000000E+00 | 0.000000E+00 | 0.000000E+00 | 0.000000E+00 | |
| 22 | 0.000000E+00 | 0.000000E+00 | 0.000000E+00 | 0.000000E+00 | |
| 31 | 0.000000E+00 | 0.000000E+00 | 0.000000E+00 | 0.000000E+00 | |
| 32 | 0.000000E+00 | 0.000000E+00 | 0.000000E+00 | 0.000000E+00 | |
| 41 | 0.000000E+00 | 0.000000E+00 | 0.000000E+00 | 0.000000E+00 | |
| 42 | 0.000000E+00 | 0.000000E+00 | 0.000000E+00 | 0.000000E+00 | |
| 51 | 0.000000E+00 | 0.000000E+00 | 0.000000E+00 | 0.000000E+00 | |
| 52 | 0.000000E+00 | 0.000000E+00 | 0.000000E+00 | 0.000000E+00 | |
| 61 | 0.000000E+00 | 0.000000E+00 | 0.000000E+00 | 0.000000E+00 | |
| 62 | 0.000000E+00 | 0.000000E+00 | 0.000000E+00 | 0.000000E+00 | |

FIG. 23

| | | Fourth Example | | | | | |
|---|---|---|---|---|---|---|---|
| Image height=0.993mm; EFL=0.951 mm, HFOV= 85.051 TTL =11.348mm; Fno=2.28 | | | | | | | |
| No. | | Curvature Radius | Ape. Stop Lens Thickness Air Gap | | Refractive Index | Abbe No. | Focal Length | Material |
| | Object | | Infinity | | | | | |
| 11 | First Lens | 20.018 | 0.633 | T1 | 1.639 | 55.472 | -2.830 | Glass |
| 12 | | 1.615 | 1.264 | G12 | | | | |
| 21 | Second Lens | -1.775 | 2.403 | T2 | 1.536 | 55.794 | -189.835 | Plastic |
| 22 | | -2.653 | 0.420 | G23 | | | | |
| 31 | Third Lens | 17.936 | 2.463 | T3 | 1.536 | 55.794 | 3.928 | Plastic |
| 32 | | -2.236 | 0.100 | G34 | | | | |
| 80 | Ape. Stop | | 0.177 | | | | | |
| 41 | Fourth Lens | 2.065 | 0.249 | T4 | 1.517 | 64.167 | 193.931 | Glass |
| 42 | | 2.023 | 0.830 | G45 | | | | |
| 51 | Fifth Lens | 34.120 | 0.120 | T5 | 1.642 | 22.409 | -2.051 | Plastic |
| 52 | | 1.228 | 0.010 | G56 | | | | |
| 61 | Sixth Lens | 1.153 | 0.822 | T6 | 1.536 | 55.794 | 1.494 | Plastic |
| 62 | | -1.891 | 0.301 | G6F | | | | |
| 70 | Filter | Infinity | 0.210 | | 1.517 | 64.167 | | |
| | | Infinity | 1.345 | | | | | |
| 71 | Image Plane | Infinity | 0.000 | | | | | |

FIG. 24

| No. | K | a2 | a4 | a6 | a8 |
|---|---|---|---|---|---|
| 11 | 0.000000E+00 | 0.000000E+00 | 0.000000E+00 | 0.000000E+00 | 0.000000E+00 |
| 12 | 0.000000E+00 | 0.000000E+00 | 0.000000E+00 | 0.000000E+00 | 0.000000E+00 |
| 21 | 0.000000E+00 | 0.000000E+00 | 4.693877E-03 | 1.619713E-02 | 1.291428E-04 |
| 22 | 0.000000E+00 | 0.000000E+00 | 2.116887E-02 | 7.481125E-03 | 4.809987E-04 |
| 31 | 0.000000E+00 | 0.000000E+00 | -4.603688E-03 | 2.945336E-03 | -3.816062E-03 |
| 32 | 0.000000E+00 | 0.000000E+00 | 3.899430E-04 | -1.586623E-03 | 1.985782E-03 |
| 41 | 0.000000E+00 | 0.000000E+00 | 0.000000E+00 | 0.000000E+00 | 0.000000E+00 |
| 42 | 0.000000E+00 | 0.000000E+00 | 0.000000E+00 | 0.000000E+00 | 0.000000E+00 |
| 51 | 0.000000E+00 | 0.000000E+00 | -4.328835E-02 | -2.098180E-01 | 0.000000E+00 |
| 52 | 0.000000E+00 | 0.000000E+00 | -6.374490E-02 | -2.839297E-01 | 0.000000E+00 |
| 61 | 0.000000E+00 | 0.000000E+00 | -1.566250E-01 | -1.139292E-01 | -2.146721E-02 |
| 62 | 0.000000E+00 | 0.000000E+00 | -7.217946E-02 | -3.927763E-02 | 8.330277E-02 |
| No. | a10 | a12 | a14 | a16 | |
| 11 | 0.000000E+00 | 0.000000E+00 | 0.000000E+00 | 0.000000E+00 | |
| 12 | 0.000000E+00 | 0.000000E+00 | 0.000000E+00 | 0.000000E+00 | |
| 21 | 0.000000E+00 | 0.000000E+00 | 0.000000E+00 | 0.000000E+00 | |
| 22 | 0.000000E+00 | 0.000000E+00 | 0.000000E+00 | 0.000000E+00 | |
| 31 | 0.000000E+00 | 0.000000E+00 | 0.000000E+00 | 0.000000E+00 | |
| 32 | 0.000000E+00 | 0.000000E+00 | 0.000000E+00 | 0.000000E+00 | |
| 41 | 0.000000E+00 | 0.000000E+00 | 0.000000E+00 | 0.000000E+00 | |
| 42 | 0.000000E+00 | 0.000000E+00 | 0.000000E+00 | 0.000000E+00 | |
| 51 | 0.000000E+00 | 0.000000E+00 | 0.000000E+00 | 0.000000E+00 | |
| 52 | 0.000000E+00 | 0.000000E+00 | 0.000000E+00 | 0.000000E+00 | |
| 61 | 0.000000E+00 | 0.000000E+00 | 0.000000E+00 | 0.000000E+00 | |
| 62 | 0.000000E+00 | 0.000000E+00 | 0.000000E+00 | 0.000000E+00 | |

FIG. 25

| Fifth Example |||||||
|---|---|---|---|---|---|---|
| Image height=0.633mm; EFL=0.686 mm, HFOV= 75.052 TTL =6.830mm; Fno=2.28 |||||||
| No. | Curvature Radius | Ape. Stop Lens Thickness Air Gap | | Refractive Index | Abbe No. | Focal Length | Material |
| | Object | | Infinity | | | | |
| 11 | First Lens | 19.103 | 0.668 | T1 | 1.639 | 55.472 | -2.312 | Glass |
| 12 | | 1.333 | 0.292 | G12 | | | | |
| 21 | Second Lens | 1.278 | 1.127 | T2 | 1.536 | 55.794 | -361.403 | Plastic |
| 22 | | 0.882 | 0.377 | G23 | | | | |
| 31 | Third Lens | -2.067 | 1.846 | T3 | 1.536 | 55.794 | 3.365 | Plastic |
| 32 | | -1.251 | 0.100 | G34 | | | | |
| 80 | Ape. Stop | | 0.100 | | | | | |
| 41 | Fourth Lens | 1.021 | 0.780 | T4 | 1.517 | 64.167 | 1.259 | Glass |
| 42 | | -1.283 | 0.100 | G45 | | | | |
| 51 | Fifth Lens | -1.016 | 0.108 | T5 | 1.642 | 22.409 | -1.017 | Plastic |
| 52 | | 1.746 | 0.100 | G56 | | | | |
| 61 | Sixth Lens | 1.533 | 0.283 | T6 | 1.536 | 55.794 | 1.519 | Plastic |
| 62 | | -1.578 | 0.100 | G6F | | | | |
| 70 | Filter | Infinity | 0.210 | | 1.517 | 64.167 | | |
| | | Infinity | 0.640 | | | | | |
| 71 | Image Plane | Infinity | 0.000 | | | | | |

FIG. 26

| No. | K | a2 | a4 | a6 | a8 |
|---|---|---|---|---|---|
| 11 | 0.000000E+00 | 0.000000E+00 | 0.000000E+00 | 0.000000E+00 | 0.000000E+00 |
| 12 | 0.000000E+00 | 0.000000E+00 | 0.000000E+00 | 0.000000E+00 | 0.000000E+00 |
| 21 | 0.000000E+00 | 0.000000E+00 | -3.429364E-02 | 1.109306E-02 | -4.398050E-02 |
| 22 | 0.000000E+00 | 0.000000E+00 | 5.184364E-02 | 2.564101E-01 | -1.039452E+00 |
| 31 | 0.000000E+00 | 0.000000E+00 | -4.140310E-02 | -1.106032E-01 | -4.837841E-01 |
| 32 | 0.000000E+00 | 0.000000E+00 | 6.254064E-02 | -1.015457E-02 | 1.015570E-01 |
| 41 | 0.000000E+00 | 0.000000E+00 | 0.000000E+00 | 0.000000E+00 | 0.000000E+00 |
| 42 | 0.000000E+00 | 0.000000E+00 | 0.000000E+00 | 0.000000E+00 | 0.000000E+00 |
| 51 | 0.000000E+00 | 0.000000E+00 | 0.000000E+00 | 0.000000E+00 | 0.000000E+00 |
| 52 | 0.000000E+00 | 0.000000E+00 | 0.000000E+00 | 0.000000E+00 | 0.000000E+00 |
| 61 | 0.000000E+00 | 0.000000E+00 | -2.174695E-01 | 2.638933E-01 | -1.464172E+00 |
| 62 | 0.000000E+00 | 0.000000E+00 | -5.478119E-02 | 3.243247E-01 | -1.251295E+00 |

| No. | a10 | a12 | a14 | a16 |
|---|---|---|---|---|
| 11 | 0.000000E+00 | 0.000000E+00 | 0.000000E+00 | 0.000000E+00 |
| 12 | 0.000000E+00 | 0.000000E+00 | 0.000000E+00 | 0.000000E+00 |
| 21 | 0.000000E+00 | 0.000000E+00 | 0.000000E+00 | 0.000000E+00 |
| 22 | 0.000000E+00 | 0.000000E+00 | 0.000000E+00 | 0.000000E+00 |
| 31 | 0.000000E+00 | 0.000000E+00 | 0.000000E+00 | 0.000000E+00 |
| 32 | 0.000000E+00 | 0.000000E+00 | 0.000000E+00 | 0.000000E+00 |
| 41 | 0.000000E+00 | 0.000000E+00 | 0.000000E+00 | 0.000000E+00 |
| 42 | 0.000000E+00 | 0.000000E+00 | 0.000000E+00 | 0.000000E+00 |
| 51 | 0.000000E+00 | 0.000000E+00 | 0.000000E+00 | 0.000000E+00 |
| 52 | 0.000000E+00 | 0.000000E+00 | 0.000000E+00 | 0.000000E+00 |
| 61 | 0.000000E+00 | 0.000000E+00 | 0.000000E+00 | 0.000000E+00 |
| 62 | 0.000000E+00 | 0.000000E+00 | 0.000000E+00 | 0.000000E+00 |

FIG. 27

| Sixth Example |||||||| 
|---|---|---|---|---|---|---|---|
| Image height=2.333mm; EFL=1.596 mm, HFOV= 85.020 TTL =8.210 mm; Fno=2.28 ||||||||
| No. | | Curvature Radius | Ape. Stop Lens Thickness Air Gap | | Refractive Index | Abbe No. | Focal Length | Material |
| | Object | | Infinity | | | | | |
| 11 | First Lens | 4.114 | 0.481 | T1 | 1.639 | 55.472 | -2.485 | Glass |
| 12 | | 1.081 | 1.193 | G12 | | | | |
| 21 | Second Lens | 5.078 | 0.160 | T2 | 1.536 | 55.794 | -5.199 | Plastic |
| 22 | | 1.763 | 0.224 | G23 | | | | |
| 31 | Third Lens | 6.309 | 1.511 | T3 | 1.536 | 55.794 | 3.118 | Plastic |
| 32 | | -2.045 | 0.100 | G34 | | | | |
| 80 | Ape. Stop | | 0.317 | | | | | |
| 41 | Fourth Lens | 2.554 | 0.739 | T4 | 1.517 | 64.167 | 2.725 | Glass |
| 42 | | -2.748 | 0.100 | G45 | | | | |
| 51 | Fifth Lens | -14.352 | 0.160 | T5 | 1.642 | 22.409 | -2.659 | Plastic |
| 52 | | 1.878 | 0.059 | G56 | | | | |
| 61 | Sixth Lens | 2.194 | 0.519 | T6 | 1.536 | 55.794 | 3.529 | Plastic |
| 62 | | -11.408 | 1.798 | G6F | | | | |
| 70 | Filter | Infinity | 0.210 | | 1.517 | 64.167 | | |
| | | Infinity | 0.640 | | | | | |
| 71 | Image Plane | Infinity | 0.000 | | | | | |

FIG. 28

| No. | K | a2 | a4 | a6 | a8 |
|---|---|---|---|---|---|
| 11 | 0.000000E+00 | 0.000000E+00 | 0.000000E+00 | 0.000000E+00 | 0.000000E+00 |
| 12 | 0.000000E+00 | 0.000000E+00 | 0.000000E+00 | 0.000000E+00 | 0.000000E+00 |
| 21 | 0.000000E+00 | 0.000000E+00 | -1.100042E-01 | 0.000000E+00 | 0.000000E+00 |
| 22 | 0.000000E+00 | 0.000000E+00 | -6.096210E-03 | 0.000000E+00 | 0.000000E+00 |
| 31 | 0.000000E+00 | 0.000000E+00 | 7.948594E-02 | 0.000000E+00 | 0.000000E+00 |
| 32 | 0.000000E+00 | 0.000000E+00 | -6.321257E-03 | 0.000000E+00 | 0.000000E+00 |
| 41 | 0.000000E+00 | 0.000000E+00 | 0.000000E+00 | 0.000000E+00 | 0.000000E+00 |
| 42 | 0.000000E+00 | 0.000000E+00 | 0.000000E+00 | 0.000000E+00 | 0.000000E+00 |
| 51 | 0.000000E+00 | 0.000000E+00 | -8.814146E-02 | 2.463723E-02 | 0.000000E+00 |
| 52 | 0.000000E+00 | 0.000000E+00 | -9.004033E-02 | 2.490419E-03 | 0.000000E+00 |
| 61 | 0.000000E+00 | 0.000000E+00 | -4.301543E-02 | 0.000000E+00 | 0.000000E+00 |
| 62 | 0.000000E+00 | 0.000000E+00 | -1.029162E-02 | 2.659725E-02 | 0.000000E+00 |
| No. | a10 | a12 | a14 | a16 | |
| 11 | 0.000000E+00 | 0.000000E+00 | 0.000000E+00 | 0.000000E+00 | |
| 12 | 0.000000E+00 | 0.000000E+00 | 0.000000E+00 | 0.000000E+00 | |
| 21 | 0.000000E+00 | 0.000000E+00 | 0.000000E+00 | 0.000000E+00 | |
| 22 | 0.000000E+00 | 0.000000E+00 | 0.000000E+00 | 0.000000E+00 | |
| 31 | 0.000000E+00 | 0.000000E+00 | 0.000000E+00 | 0.000000E+00 | |
| 32 | 0.000000E+00 | 0.000000E+00 | 0.000000E+00 | 0.000000E+00 | |
| 41 | 0.000000E+00 | 0.000000E+00 | 0.000000E+00 | 0.000000E+00 | |
| 42 | 0.000000E+00 | 0.000000E+00 | 0.000000E+00 | 0.000000E+00 | |
| 51 | 0.000000E+00 | 0.000000E+00 | 0.000000E+00 | 0.000000E+00 | |
| 52 | 0.000000E+00 | 0.000000E+00 | 0.000000E+00 | 0.000000E+00 | |
| 61 | 0.000000E+00 | 0.000000E+00 | 0.000000E+00 | 0.000000E+00 | |
| 62 | 0.000000E+00 | 0.000000E+00 | 0.000000E+00 | 0.000000E+00 | |

FIG. 29

| Example | Example 1 | Example 2 | Example 3 | Example 4 | Example 5 | Example 6 |
|---|---|---|---|---|---|---|
| T1 | 0.398 | 0.549 | 1.019 | 0.633 | 0.668 | 0.481 |
| G1 | 0.872 | 1.755 | 0.689 | 1.264 | 0.292 | 1.193 |
| T2 | 0.138 | 1.466 | 0.282 | 2.403 | 1.127 | 0.160 |
| G2 | 0.345 | 0.420 | 0.703 | 0.420 | 0.377 | 0.224 |
| T3 | 1.819 | 0.870 | 2.079 | 2.463 | 1.846 | 1.511 |
| G3 | 0.561 | 0.200 | 0.569 | 0.277 | 0.200 | 0.417 |
| T4 | 0.706 | 2.000 | 0.500 | 0.249 | 0.780 | 0.739 |
| G4 | 0.113 | 0.200 | 0.156 | 0.830 | 0.100 | 0.100 |
| T5 | 0.250 | 0.120 | 0.201 | 0.120 | 0.108 | 0.160 |
| G5 | 0.100 | 0.010 | 0.100 | 0.010 | 0.100 | 0.059 |
| T6 | 0.494 | 0.650 | 0.326 | 0.822 | 0.283 | 0.519 |
| G6 | 0.100 | 0.301 | 0.218 | 0.301 | 0.100 | 1.798 |
| TF | 0.210 | 0.210 | 0.210 | 0.210 | 0.210 | 0.210 |
| GFP | 0.625 | 0.818 | 0.640 | 1.345 | 0.640 | 0.640 |
| AAG | 1.991 | 2.585 | 2.217 | 2.802 | 1.069 | 1.992 |
| ALT | 3.806 | 5.655 | 4.406 | 6.690 | 4.811 | 3.570 |
| BFL | 0.935 | 1.329 | 1.068 | 1.856 | 0.950 | 2.648 |
| TTL | 6.732 | 9.569 | 7.692 | 11.348 | 6.830 | 8.210 |
| TL | 5.797 | 8.240 | 6.623 | 9.492 | 5.880 | 5.562 |
| EFL | 0.622 | 0.806 | 0.692 | 0.954 | 0.687 | 1.597 |
| v1 | 55.472 | 55.472 | 55.472 | 55.472 | 55.472 | 55.472 |
| v2 | 55.994 | 55.794 | 55.794 | 55.794 | 55.794 | 55.794 |
| v3 | 49.922 | 55.794 | 55.794 | 55.794 | 55.794 | 55.794 |
| v4 | 64.167 | 64.167 | 64.167 | 64.167 | 64.167 | 64.167 |
| v5 | 22.409 | 22.409 | 22.409 | 22.409 | 22.409 | 22.409 |
| v6 | 55.794 | 55.794 | 55.794 | 55.794 | 55.794 | 55.794 |

FIG. 30

| Example | Example 1 | Example 2 | Example 3 | Example 4 | Example 5 | Example 6 |
|---|---|---|---|---|---|---|
| \|v2-v3\| | 6.072 | 0.000 | 0.000 | 0.000 | 0.000 | 0.000 |
| G12/G45 | 7.731 | 8.775 | 4.421 | 1.523 | 2.923 | 11.929 |
| G34/T2 | 4.057 | 0.136 | 2.019 | 0.115 | 0.177 | 2.603 |
| G23/T2 | 2.499 | 0.287 | 2.493 | 0.175 | 0.334 | 1.400 |
| T4/G34 | 1.260 | 10.000 | 0.878 | 0.899 | 3.898 | 1.773 |
| T4/G45 | 6.261 | 10.000 | 3.206 | 0.300 | 7.797 | 7.387 |
| G23/T5 | 1.382 | 3.500 | 3.500 | 3.500 | 3.500 | 1.400 |
| T6/G45 | 4.380 | 3.250 | 2.088 | 0.989 | 2.827 | 5.187 |
| (T5+G56+T6)/G34 | 1.505 | 3.900 | 1.100 | 3.433 | 2.452 | 1.771 |
| BFL/T1 | 2.348 | 2.419 | 1.048 | 2.934 | 1.422 | 5.500 |
| AAG/T1 | 5.000 | 4.706 | 2.176 | 4.428 | 1.600 | 4.138 |
| TL/T1 | 14.559 | 15.000 | 6.500 | 15.000 | 8.800 | 11.552 |
| TTL/T3 | 3.700 | 11.000 | 3.700 | 4.607 | 3.700 | 5.434 |
| T3/EFL | 2.926 | 1.079 | 3.006 | 2.581 | 2.687 | 0.946 |
| ALT/BFL | 4.071 | 4.255 | 4.124 | 3.603 | 5.064 | 1.348 |
| TL/BFL | 6.200 | 6.200 | 6.200 | 5.113 | 6.190 | 2.100 |
| TTL/ALT | 1.769 | 1.692 | 1.746 | 1.696 | 1.420 | 2.300 |
| ALT/EFL | 6.121 | 7.013 | 6.370 | 7.009 | 7.004 | 2.235 |
| TL/AAG | 2.912 | 3.188 | 2.987 | 3.388 | 5.500 | 2.792 |
| AAG/EFL | 2.129 | 1.945 | 2.076 | 1.509 | 1.125 | 0.752 |

FIG. 31

OPTICAL IMAGING LENS

BACKGROUND OF THE INVENTION

1. Field of the Invention

The present invention generally relates to an optical imaging lens. Specifically speaking, the present invention is directed to an optical imaging lens for the application of dual band of visible light as well as NIR (near infrared) for use in portable electronic devices such as mobile phones, cameras, tablet personal computers, personal digital assistants (PDA), vehicles, or rescue devices for recording videos.

2. Description of the Prior Art

The specifications of portable electronic devices change all the time and the key element—an optical imaging lens—develops concurrently so a good imaging quality is needed as well as a smaller size. As far as the imaging quality is concerned, the demands for better imaging quality are getting higher and higher with the development of optical technology. In addition to the thinner lens sizes, the imaging quality and performance are critical as well in the optical lens design field.

Besides, in different environments, the focal length of the optical imaging lens may be changed by different temperature, thereby affecting the imaging quality. Therefore, it is expected that the focal shift of the optical imaging lens is not susceptible to changes in different temperatures.

In addition, the applications of an optical imaging lens is not only limited to take pictures and to record videos but also for the environmental surveillance, the dashboard cameras, the VR trackers or the face recognition. With the increasing applications, one single device may need to install at least one visible light imaging lens as well as an NIR imaging lens at the same time. Such demands for the double imaging lens sets not only increase the cost as well as the complication of the device but also influence the appearance design of the device. Furthermore, the focal length of the visible light and the focal length of near-infrared in the optical imaging lens are usually different. In order to design an optical imaging lens that can receive visible light and near-infrared (NIR) simultaneously, the conventional technique is to use the voice coil motor (VCM) in the lens set module, to adjust the position of the sensor.

Regarding the above-mentioned issues, an optical imaging lens with low focal shift in different temperatures and with simplified dual band detection function that detecting visible light and near infrared (NIR), and further having good image quality and shortened lens length is the focus of this design improvement. The designing of the optical lens is not just scaling down the optical lens which has good optical performance, but also needs to consider the material characteristics and satisfy some practical requirements like assembly yield. Accordingly, it is more difficult to diminish a mini-lens than to diminish a conventional one. Therefore, how to reduce the total length of a photographic device, but still maintain good optical performance, is an important objective to research.

SUMMARY OF THE INVENTION

In the light of the above, the present invention accordingly proposes an optical imaging lens which has increased half field of view, is capable of dual-wavebands capture and maintains appropriate lens set length. The optical imaging lens of six lens elements of the present invention from an object side toward an image side in order along an optical axis has a first lens element, a second lens element, a third lens element, a fourth lens element, a fifth lens element and a sixth lens element. Each lens element respectively has an object-side surface which faces toward an object side to allow an imaging ray to pass through as well as an image-side surface which faces toward an image side to allow the imaging ray to pass through.

The present invention provides an optical imaging lens, the optical imaging lens includes a first lens element, a second lens element, a third lens element, a fourth lens element, a fifth lens element and a sixth lens element, an aperture stop disposed between said third and fourth lens element, said first lens element has negative refractive power, said second lens element has negative refractive power, said fourth lens element has an object-side surface with a convex portion in a vicinity of the optical axis, and said fifth lens element has an image-side surface with a concave portion in a vicinity of the optical axis. At least one lens element of the six lens elements disposed adjacent to an aperture stop has positive refractive power and made by glass material, except for the lens elements with glass material, other lens elements with refractive powers are plastic lens elements, the Abbe numbers of the second and the third lens element are ν2 and ν3 respectively, and the optical imaging lens satisfies: |ν2−ν3|≤15.000.

In the optical imaging lens of the present invention, G12 is an air gap between said first lens element and said second lens element along said optical axis, G23 is an air gap between said second lens element and said third lens element along said optical axis, and the optical imaging lens satisfies the relationship: G12/G45≤12.000.

In the optical imaging lens of the present invention, G34 is an air gap between said third lens element and said fourth lens element along said optical axis, T2 is a thickness of said second lens element along said optical axis, and the optical imaging lens satisfies the relationship: G34/T2≤5.000.

In the optical imaging lens of the present invention, G23 is an air gap between said second lens element and said third lens element along said optical axis, T2 is a thickness of said second lens element along said optical axis, and the optical imaging lens satisfies the relationship: G23/T2≤2.500.

In the optical imaging lens of the present invention, G34 is an air gap between said third lens element and said fourth lens element along said optical axis, T4 is a thickness of said fourth lens element along said optical axis, and the optical imaging lens satisfies the relationship: T4/G34≤10.000.

In the optical imaging lens of the present invention, G45 is an air gap between said fourth lens element and said fifth lens element along said optical axis, T4 is a thickness of said fourth lens element along said optical axis, and the optical imaging lens satisfies the relationship: T4/G45≤10.000.

In the optical imaging lens of the present invention, G23 is an air gap between said second lens element and said third lens element along said optical axis, T5 is a thickness of said fifth lens element along said optical axis, and the optical imaging lens satisfies the relationship: G23/T5≤3.500.

In the optical imaging lens of the present invention, G45 is an air gap between said fourth lens element and said fifth lens element along said optical axis, T6 is a thickness of said sixth lens element along said optical axis, and the optical imaging lens satisfies the relationship: T6/G45≤5.300.

In the optical imaging lens of the present invention, G34 is an air gap between said third lens element and said fourth lens element along said optical axis, G56 is an air gap between said fifth lens element and said sixth lens element along said optical axis, T5 is a thickness of said fifth lens element along said optical axis, T6 is a thickness of said sixth lens element along said optical axis, and the optical imaging lens satisfies the relationship: $(T5+G56+T6)/G34 \leq 3.900$.

In the optical imaging lens of the present invention, the distance between the image-side surface of said sixth lens element and an image plane along said optical axis is BFL, T1 is a thickness of said first lens element along said optical axis, and the optical imaging lens satisfies the relationship: $BFL/T1 \leq 5.500$.

In the optical imaging lens of the present invention, AAG is a sum of all five air gaps between each lens elements from said first lens element to said sixth lens element along said optical axis, T1 is a thickness of said first lens element along said optical axis, and the optical imaging lens satisfies the relationship: $AAG/T1 \leq 5.000$.

In the optical imaging lens of the present invention, the distance from said object-side surface of said first lens element to said image-side surface of said sixth lens element along said optical axis is TL, T1 is a thickness of said first lens element along said optical axis, and the optical imaging lens satisfies the relationship: $TL/T1 \leq 15.000$.

In the optical imaging lens of the present invention, TTL is a distance from said object-side surface of said first lens element to an image plane, T3 is a thickness of said third lens element along said optical axis, and the optical imaging lens satisfies the relationship: $TTL/T3 \leq 11.000$.

In the optical imaging lens of the present invention, EFL is an effective focal length of the optical imaging lens, T3 is a thickness of said third lens element along said optical axis, and the optical imaging lens satisfies the relationship: $T3/EFL \leq 3.100$.

In the optical imaging lens of the present invention, ALT is a total thickness of all six lens elements along said optical axis, the distance between the image-side surface of said sixth lens element and an image plane along said optical axis is BFL, and the optical imaging lens satisfies the relationship: $ALT/BFL \leq 5.300$.

In the optical imaging lens of the present invention, the distance from said object-side surface of said first lens element to said image-side surface of said sixth lens element along said optical axis is TL, the distance between the image-side surface of said sixth lens element and an image plane along said optical axis is BFL, and the optical imaging lens satisfies the relationship: $TL/BFL \leq 6.200$.

In the optical imaging lens of the present invention, TTL is a distance from said object-side surface of said first lens element to an image plane, ALT is a total thickness of all six lens elements along said optical axis, and the optical imaging lens satisfies the relationship: $TTL/ALT \leq 2.300$.

In the optical imaging lens of the present invention, ALT is a total thickness of all six lens elements along said optical axis, EFL is an effective focal length of the optical imaging lens, and the optical imaging lens satisfies the relationship: $ALT/EFL \leq 7.100$.

In the optical imaging lens of the present invention, the distance from said object-side surface of said first lens element to said image-side surface of said sixth lens element along said optical axis is TL, AAG is a sum of all five air gaps between each lens elements from said first lens element to said sixth lens element along said optical axis, and the optical imaging lens satisfies the relationship: $TL/AAG \leq 5.500$.

In the optical imaging lens of the present invention, AAG is a sum of all five air gaps between each lens elements from said first lens element to said sixth lens element along said optical axis, EFL is an effective focal length of the optical imaging lens, and the optical imaging lens satisfies the relationship: $AAG/EFL \leq 3.200$.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIGS. 1-5 illustrate the methods for determining the surface shapes and for determining one region is a region in a vicinity of the optical axis or the region in a vicinity of its periphery of one lens element.

FIG. 18 shows the optical data of the first example of the optical imaging lens set.

FIG. 19 shows the aspheric surface data of the first example.

FIG. 20 shows the optical data of the second example of the optical imaging lens set.

FIG. 21 shows the aspheric surface data of the second example.

FIG. 22 shows the optical data of the third example of the optical imaging lens set.

FIG. 23 shows the aspheric surface data of the third example.

FIG. 24 shows the optical data of the fourth example of the optical imaging lens set.

FIG. 25 shows the aspheric surface data of the fourth example.

FIG. 26 shows the optical data of the fifth example of the optical imaging lens set.

FIG. 27 shows the aspheric surface data of the fifth example.

FIG. 28 shows the optical data of the sixth example of the optical imaging lens set.

FIG. 29 shows the aspheric surface data of the sixth example.

FIG. 30 shows some important ratios in the examples.

FIG. 31 shows some important ratios in the examples.

DETAILED DESCRIPTION

Figure 6:
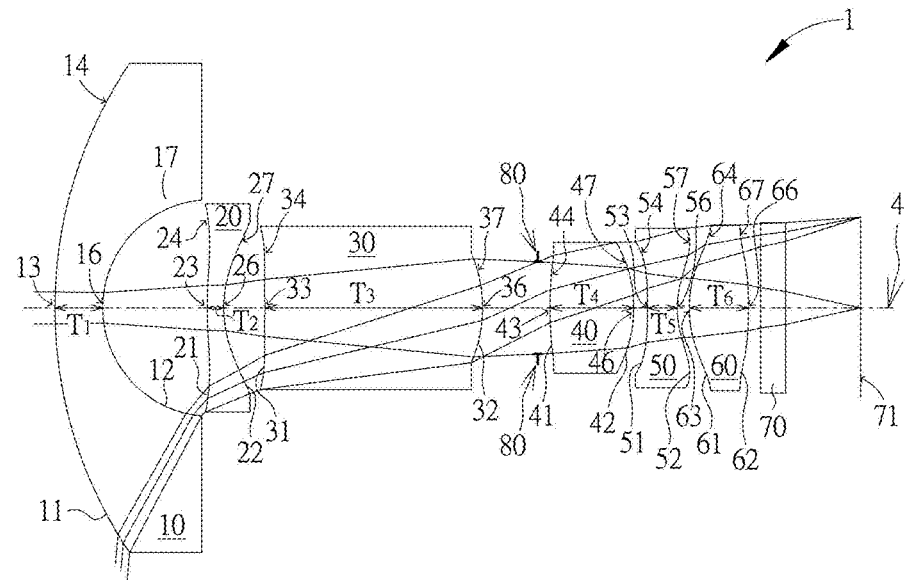
FIG. 6 illustrates a first example of the optical imaging lens set of the present invention.

Before the detailed description of the present invention, the first thing to be noticed is that in the present invention, similar (not necessarily identical) elements are labeled as the same numeral references. In the entire present specification, "a certain lens element has negative/positive refractive power" refers to the portion in a vicinity of the optical axis of the lens element has negative/positive refractive power calculated by Gaussian optical theory. An object-side/image-side surface refers to the region which allows imaging light passing through, in the drawing, imaging light includes Lc (chief ray) and Lm (marginal ray). As shown in FIG. 1, the optical axis is "I" and the lens element is symmetrical with respect to the optical axis I. The region A that near the optical axis and for light to pass through is the region in a vicinity of the optical axis, and the region C that the marginal ray passing through is the region in a vicinity of a certain lens element's periphery. In addition, the lens element may include an extension portion E for the lens element to be installed in an optical imaging lens (that is the region outside the region C perpendicular to the optical axis). Ideally speaking, no light would pass through the extension portion, and the actual structure and shape of the extension portion is not limited to this and may have other variations. For the reason of simplicity, the extension portion is not illustrated in the following examples. More, precisely, the method for determining the surface shapes or the region in a vicinity of the optical axis, the region in a vicinity of its periphery and other regions is described in the following paragraphs:

1. FIG. 1 is a radial cross-sectional view of a lens element. Before determining boundaries of those aforesaid portions, two referential points should be defined first, middle point and conversion point. The middle point of a surface of a lens element is a point of intersection of that surface and the optical axis. The conversion point is a point on a surface of a lens element, where the tangent line of that point is perpendicular to the optical axis. Additionally, if multiple conversion points appear on one single surface, then these conversion points are sequentially named along the radial direction of the surface with numbers starting from the first conversion point. For instance, the first conversion point (closest one to the optical axis), the second conversion point, and the $N^{th}$ conversion point (farthest one to the optical axis within the scope of the clear aperture of the surface). The portion of a surface of the lens element between the middle point and the first conversion point is defined as the portion in a vicinity of the optical axis. The portion located radially outside of the $N^{th}$ conversion point (but still within the scope of the clear aperture) is defined as the portion in a vicinity of a periphery of the lens element. In some embodiments, there are other portions existing between the portion in a vicinity of the optical axis and the portion in a vicinity of a periphery of the lens element; the numbers of portions depend on the numbers of the conversion point(s). In addition, the radius of the clear aperture (or a so-called effective radius) of a surface is defined as the radial distance from the optical axis I to a point of intersection of the marginal ray Lm and the surface of the lens element.

2. Referring to FIG. 2, determining the shape of a portion is convex or concave depends on whether a collimated ray passing through that portion converges or diverges. That is, while applying a collimated ray to a portion to be determined in terms of shape, the collimated ray passing through that portion will be bended and the ray itself or its extension line will eventually meet the optical axis. The shape of that portion can be determined by whether the ray or its extension line meets (intersects) the optical axis (focal point) at the object-side or image-side. For instance, if the ray itself intersects the optical axis at the image side of the lens element after passing through a portion, i.e. the focal point of this ray is at the image side (see point R in FIG. 2), the portion will be determined as having a convex shape. On the contrary, if the ray diverges after passing through a portion, the extension line of the ray intersects the optical axis at the object side of the lens element, i.e. the focal point of the ray is at the object side (see point M in FIG. 2), that portion will be determined as having a concave shape. Therefore, referring to FIG. 2, the portion between the middle point and the first conversion point has a convex shape, the portion located radially outside of the first conversion point has a concave shape, and the first conversion point is the point where the portion having a convex shape changes to the portion having a concave shape, namely the border of two adjacent portions. Alternatively, there is another common way for a person with ordinary skill in the art to tell whether a portion in a vicinity of the optical axis has a convex or concave shape by referring to the sign of an "R" value, which is the (paraxial) radius of curvature of a lens surface. The R value is commonly used in conventional optical design software such as Zemax and CodeV. The R value usually appears in the lens data sheet in the software. For an object-side surface, positive R means that the object-side surface is convex, and negative R means that the object-side surface is concave. Conversely, for an image-side surface, positive R means that the image-side surface is concave, and negative R means that the image-side surface is convex. The result found by using this method should be consistent as by using the other way mentioned above, which determines surface shapes by referring to whether the focal point of a collimated ray is at the object side or the image side.

3. For none conversion point cases, the portion in a vicinity of the optical axis is defined as the portion between 0~50% of the effective radius (radius of the clear aperture) of the surface, whereas the portion in a vicinity of a periphery of the lens element is defined as the portion between 50~100% of effective radius (radius of the clear aperture) of the surface.

Referring to the first example depicted in FIG. 3, only one conversion point, namely a first conversion point, appears within the clear aperture of the image-side surface of the lens element. Portion I is a portion in a vicinity of the optical axis, and portion II is a portion in a vicinity of a periphery of the lens element. The portion in a vicinity of the optical axis is determined as having a concave surface due to the R value at the image-side surface of the lens element is positive. The shape of the portion in a vicinity of a periphery of the lens element is different from that of the radially inner adjacent portion, i.e. the shape of the portion in a vicinity of a periphery of the lens element is different from the shape of the portion in a vicinity of the optical axis; the portion in a vicinity of a periphery of the lens element has a convex shape.

Referring to the second example depicted in FIG. 4, a first conversion point and a second conversion point exist on the object-side surface (within the clear aperture) of a lens element. In which portion I is the portion in a vicinity of the optical axis, and portion III is a portion in a vicinity of a periphery of the lens element. The portion in a vicinity of the optical axis has a convex shape because the R value at the object-side surface of the lens element is positive. The portion in a vicinity of a periphery of the lens element (portion III) has a convex shape. What is more, there is another portion having a concave shape existing between the first and second conversion point (portion II).

Referring to a third example depicted in FIG. 5, no conversion point exists on the object-side surface of the lens element. In this case, the portion between 0~50% of the effective radius (radius of the clear aperture) is determined as the portion in a vicinity of the optical axis, and the portion between 50~100% of the effective radius is determined as the portion in a vicinity of a periphery of the lens element. The portion in a vicinity of the optical axis of the object-side surface of the lens element is determined as having a convex shape due to its positive R value, and the portion in a vicinity of a periphery of the lens element is determined as having a convex shape as well.

As shown in FIG. 6, the optical imaging lens set 1 of seven lens elements of the present invention, sequentially located from an object side 2 (where an object is located) to an image side 3 along an optical axis 4, has an aperture stop (ape. stop) 80, a first lens element 10, a second lens element 20, a third lens element 30, a fourth lens element 40, a fifth lens element 50, a sixth lens element 60, a filter 70 and an image plane 71. Generally speaking, the first lens element 10, the second lens element 20, the third lens element 30, the fourth lens element 40, the fifth lens element 50 and the sixth lens element 60 maybe made of a transparent plastic or glass material, and each has an appropriate refractive power. There are exclusively six lens elements, which means the first lens element 10, the second lens element 20, the third lens element 30, the fourth lens element 40, the fifth lens element 50 and the sixth lens element 60, with refractive power in the optical imaging lens set 1 of the present invention. The optical axis 4 is the optical axis of the entire optical imaging lens set 1, and the optical axis of each of the lens elements coincides with the optical axis of the optical imaging lens set 1.

Furthermore, the optical imaging lens set 1 includes an aperture stop (ape. stop) 80 disposed in an appropriate position. In FIG. 6, the aperture stop 80 is disposed between the third lens element 30 and the fourth lens element 40. When light emitted or reflected by an object (not shown) which is located at the object side 2 enters the optical imaging lens set 1 of the present invention, it forms a clear and sharp image on the image plane 91 at the image side 3 after passing through the first lens element 10, the second lens element 20, the third lens element 30, the aperture stop 80, the fourth lens element 40, the fifth lens element 50, the sixth lens element 60 and the filter 70. In one embodiments of the present invention, the optional filter 70 may be a filter of various suitable functions, for example, the filter 70 maybe a cut filter of a specific wavelength, placed between the image-side surface 62 of the sixth lens element 60 and the image plane 71.

Each lens element in the optical imaging lens 1 of the present invention has an object-side surface facing toward the object side 2 as well as an image-side surface facing toward the image side 3. For example, the first lens element 10 has an object-side surface 11 and an image-side surface 12; the second lens element 20 has an object-side surface 21 and an image-side surface 22; the third lens element 30 has an object-side surface 31 and an image-side surface 32; the fourth lens element 40 has an object-side surface 41 and an image-side surface 42; the fifth lens element 50 has an object-side surface 51 and an image-side surface 52; and the sixth lens element 60 has an object-side surface 61 and an image-side surface 62. In addition, each object-side surface and image-side surface in the optical imaging lens 1 of the present invention has a portion (or region) in a vicinity of its periphery (periphery region) away from the optical axis 4 as well as a portion in a vicinity of the optical axis (optical axis portion) close to the optical axis 4.

Each lens element in the optical imaging lens 1 of the present invention further has a central thickness T on the optical axis 4. For example, the first lens element 10 has a first lens element thickness T1, the second lens element 20 has a second lens element thickness T2, the third lens element 30 has a third lens element thickness T3, the fourth lens element 40 has a fourth lens element thickness T4, the fifth lens element 50 has a fifth lens element thickness T5, the sixth lens element 60 has a sixth lens element thickness T6. Therefore, the total thickness of all the lens elements in the optical imaging lens 1 along the optical axis 4 is ALT=T1+T2+T3+T4+T5+T6.

In addition, between two adjacent lens elements in the optical imaging lens 1 of the present invention there may be an air gap along the optical axis 4. For example, there is an air gap G12 disposed between the first lens element 10 and the second lens element 20, an air gap G23 disposed between the second lens element 20 and the third lens element 30, an air gap G34 disposed between the third lens element 30 and the fourth lens element 40, an air gap G45 disposed between the fourth lens element 40 and the fifth lens element 50 as well as there is an air gap G56 disposed between the fifth lens element 50 and the sixth lens element 60. Therefore, the sum of total five air gaps between adjacent lens elements from the first lens element 10 to the sixth lens element 60 along the optical axis 4 is AAG=G12+G23+G34+G45+G56.

In addition, the distance from the object-side surface 11 of the first lens element 10 to the image-side surface 62 of the sixth lens element 60 along the optical axis 4 is TL. The distance between the object-side surface 11 of the first lens element 10 to the image plane 71, namely the total length of the optical imaging lens along the optical axis 4 is TTL; the effective focal length of the optical imaging lens is EFL; the distance between the image-side surface 62 of the sixth lens element 60 and the image plane 71 along the optical axis 4 is BFL.

Furthermore, the focal length of the first lens element 10 is f1; the focal length of the second lens element 20 is f2; the focal length of the third lens element 30 is f3; the focal length of the fourth lens element 40 is f4; the focal length of the fifth lens element 50 is f5; the focal length of the sixth lens element 60 is f6; the refractive index of the first lens element 10 is n1; the refractive index of the second lens element 20 is n2; the refractive index of the third lens element 30 is n3; the refractive index of the fourth lens element 40 is n4; the refractive index of the fifth lens element 50 is n5; the refractive index of the sixth lens element 60 is n6; the Abbe number of the first lens element 10 is v1; the Abbe number of the second lens element 20 is v2; the Abbe number of the third lens element 30 is v3; and the Abbe number of the fourth lens element 40 is v4; the Abbe number of the fifth lens element 50 is v5; and the Abbe number of the sixth lens element 60 is v6. The distance between the image-side surface 62 of the sixth lens element 60 to the filter 70 along the optical axis 4 is G6F; the thickness of the filter 70 along the optical axis 4 is TF; the distance between the filter 70 to the image plane 71 along the optical axis 4 is GFP; the distance between the image-side surface 62 of the sixth lens element 60 and the image plane 71 along the optical axis 4 is BFL. Therefore, BFL=G6F+TF+GFP.

FIRST EXAMPLE

Figures 7A, 7B, 7C, 7D:
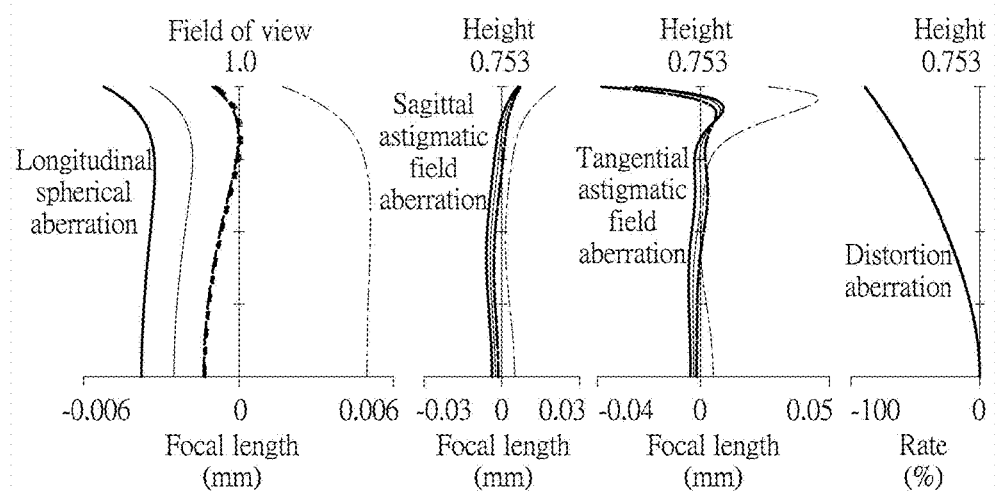
FIG. 7A illustrates the longitudinal spherical aberration of the first example.
FIG. 7B illustrates the astigmatic aberration on the sagittal direction of the first example.
FIG. 7C illustrates the astigmatic aberration on the tangential direction of the first example.
FIG. 7D illustrates the distortion aberration of the first example.

Please refer to FIG. 6 which illustrates the first example of the optical imaging lens 1 of the present invention. Please refer to FIG. 7A for the longitudinal spherical aberration on the image plane 71 of the first example; please refer to FIG. 7B for the astigmatic field aberration on the sagittal direction; please refer to FIG. 7C for the astigmatic field aberration on the tangential direction, and please refer to FIG. 7D for the distortion aberration. The Y axis of the spherical aberration in each example is "field of view" for 1.0. The Y axis of the astigmatic field and the distortion in each example stands for "image height", which is 0.753 mm.

The optical imaging lens 1 of the first example has six lens elements 10 to 60 with refractive power. The optical imaging lens 1 also has a filter 70, an aperture stop 80, and an image plane 71. The aperture stop 80 is provided between the third lens element 30 and the fourth lens element 40. The filter 70 may be used for preventing specific wavelength light reaching the image plane to adversely affect the imaging quality.

The first lens element 10 is made of a glass material and has negative refractive power. The object-side surface 11 facing toward the object side 2 has a convex portion 13 in the vicinity of the optical axis and a convex portion 14 in a vicinity of its circular periphery. The image-side surface 12 facing toward the image side 3 has a concave portion 16 in the vicinity of the optical axis and a concave portion 17 in a vicinity of its circular periphery. Besides, both the object-side surface 11 and the image-side 12 of the first lens element 10 are spherical surfaces.

The second lens element 20 is made of a plastic material and has negative refractive power. The object-side surface 21 facing toward the object side 2 has a convex portion 23 in the vicinity of the optical axis 4 and a concave portion 24 in a vicinity of its circular periphery. The image-side surface 22 facing toward the image side 3 has a concave portion 26 in the vicinity of the optical axis 4 and a concave portion 27 in a vicinity of its circular periphery. Besides, both the object-side surface 21 and the image-side 22 of the second lens element 20 are aspherical surfaces.

The third lens element 30 is made of a plastic material and has positive refractive power. The object-side surface 31 facing toward the object side 2 has a concave portion 33 in the vicinity of the optical axis and a concave portion 34 in a vicinity of its circular periphery. The image-side surface 32 facing toward the image side 3 has a convex portion 36 in the vicinity of the optical axis 4 and a convex portion 37 in a vicinity of its circular periphery. Besides, both the object-side surface 31 and the image-side 32 of the third lens element 30 are aspherical surfaces.

The fourth lens element 40 is made of a glass material and has positive refractive power. The object-side surface 41 facing toward the object side 2 has a convex portion 43 in the vicinity of the optical axis 4 and a convex portion 44 in a vicinity of its circular periphery. The image-side surface 42 facing toward the image side 3 has a convex portion 46 in the vicinity of the optical axis 4 and a convex portion 47 in a vicinity of its circular periphery. Besides, both the object-side surface 41 and the image-side 42 of the fourth lens element 40 are spherical surfaces.

The fifth lens element 50 is made of a plastic material and has negative refractive power. The object-side surface 51 facing toward the object side 2 has a concave portion 53 in the vicinity of the optical axis 4 and a concave portion 54 in a vicinity of its circular periphery. The image-side surface 52 facing toward the image side 3 has a concave portion 56 in the vicinity of the optical axis 4 and a convex portion 57 in a vicinity of its circular periphery. Besides, both the object-side surface 51 and the image-side 52 of the fifth lens element 50 are aspherical surfaces.

The sixth lens element 60 is made of a plastic material and has positive refractive power. The object-side surface 61 facing toward the object side 2 has a convex portion 63 in the vicinity of the optical axis and a convex portion 64 in a vicinity of its circular periphery. The image-side surface 62 facing toward the image side 3 has a convex portion 66 in the vicinity of the optical axis 4 and a convex portion 67 in a vicinity of its circular periphery. Besides, both the object-side surface 61 and the image-side 62 of the sixth lens element 60 are aspherical surfaces. The filter 70 is disposed between the image-side 62 of the sixth lens element 60 and the image plane 71.

In the first lens element 10, the second lens element 20, the third lens element 30, the fourth lens element 40, the fifth lens element 50 and the sixth lens element 60 of the optical imaging lens element 1 of the present invention, there are 12 surfaces, such as the object-side surfaces 11/21/31/41/51/61 and the image-side surfaces 12/22/32/42/52/62. If a surface is aspherical, these aspheric coefficients are defined according to the following formula:

$$Z(Y) = \frac{Y^2}{R} \bigg/ \left(1 + \sqrt{1-(1+K)\frac{Y^2}{R^2}}\right) + \sum_{i=1}^{n} a_i \times Y^i$$

In which:

R represents the curvature radius of the lens element surface;

Z represents the depth of an aspherical surface (the perpendicular distance between the point of the aspherical surface at a distance Y from the optical axis and the tangent plane of the vertex on the optical axis of the aspherical surface);

Y represents a vertical distance from a point on the aspherical surface to the optical axis;

K is a conic constant;

ai is the aspheric coefficient of the ith order.

The optical data of the first example of the optical imaging lens 1 are shown in FIG. 18 while the aspheric surface data are shown in FIG. 19. There is a virtual reference surface of infinite curvature radius (not shown), VRS for short, disposed between the filter 70 and the image plane 71. In the present examples of the optical imaging lens, the f-number of the entire optical lens element system is Fno, EFL is the effective focal length, HFOV stands for the half field of view which is half of the field of view of the entire optical imaging lens 1, and the unit for the curvature radius, the thickness and the focal length is in millimeters (mm). In this example, the image height is 0.753 mm, EFL is 0.621 mm, HFOV is 85.019 degrees, TTL is 6.732 mm, and Fno is 2.28. In addition, the optical imaging lens of the first embodiment has good focal shift performance, the focal shift is 0.000 mm at room temperature 20° C., and the focal shift is −0.011 mm at ambient temperature 50° C.

SECOND EXAMPLE

Figure 8:
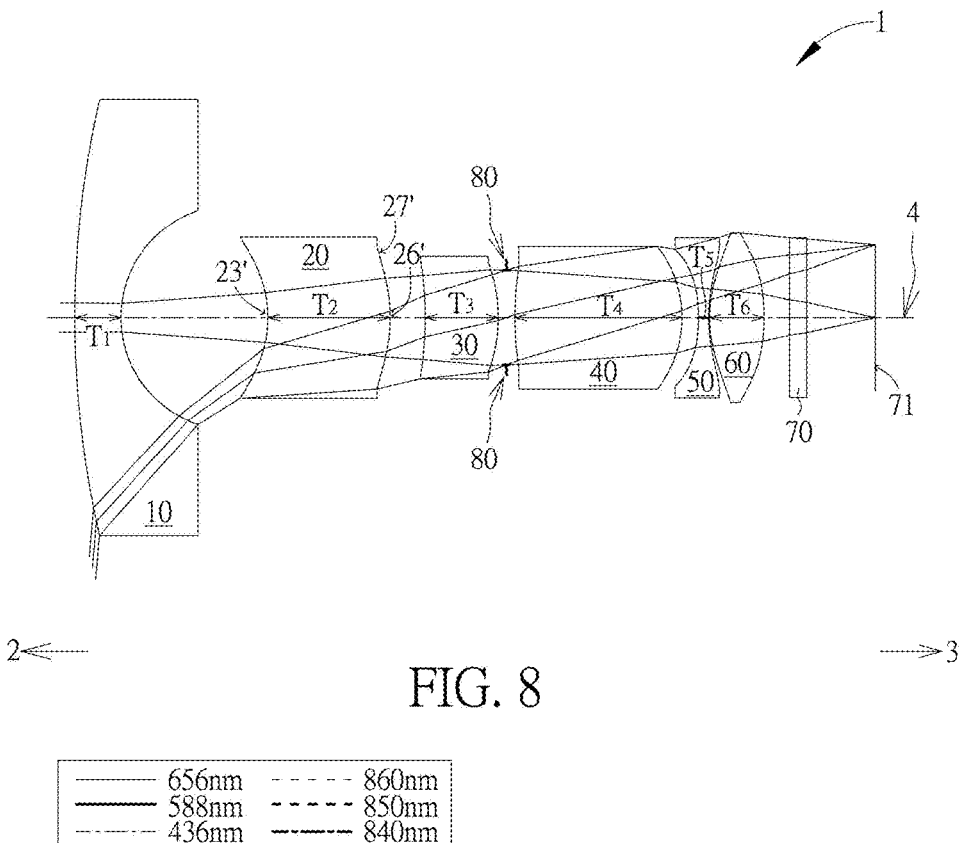
FIG. 8 illustrates a second example of the optical imaging lens set of six lens elements of the present invention.
Figures 9A, 9B, 9C, 9D:
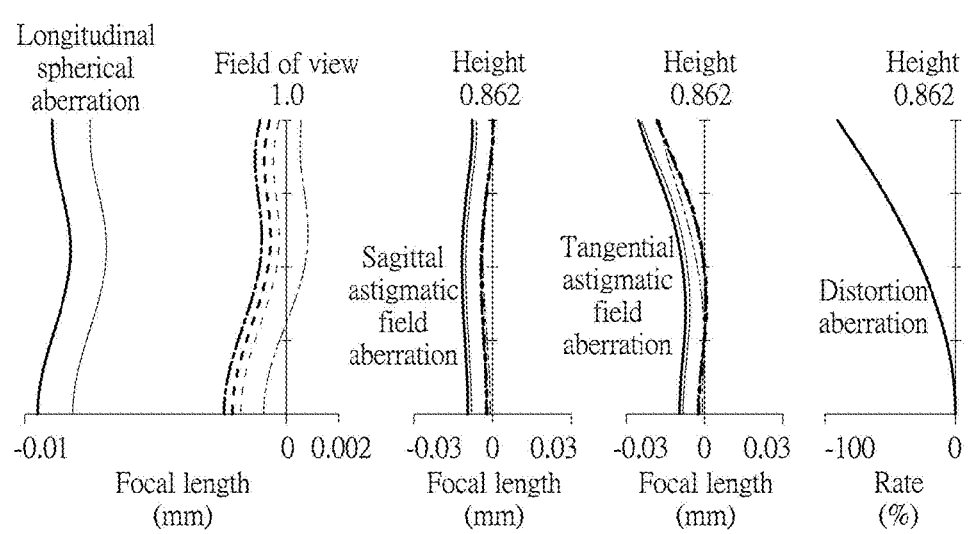
FIG. 9A illustrates the longitudinal spherical aberration of the second example.
FIG. 9B illustrates the astigmatic aberration on the sagittal direction of the second example.
FIG. 9C illustrates the astigmatic aberration on the tangential direction of the second example.
FIG. 9D illustrates the distortion aberration of the second example.

Please refer to FIG. 8 which illustrates the second example of the optical imaging lens 1 of the present invention. It is noted that from the second example to the following examples, in order to simplify the figures, only the components different from what the first example has, and the basic lens elements will be labeled in figures. Other components that are the same as what the first example has, such as the object-side surface, the image-side surface, the part in a vicinity of the optical axis and the part in a vicinity of its circular periphery will be omitted in the following examples. Please refer to FIG. 9A for the longitudinal spherical aberration on the image plane 71 of the second example, please refer to FIG. 9B for the astigmatic aberration on the sagittal direction, please refer to FIG. 9C for the astigmatic aberration on the tangential direction, and please refer to FIG. 9D for the distortion aberration. The components in the second example are similar to those in the first example, but the optical data such as the curvature radius, the refractive power, the lens thickness, the lens focal length, the aspheric surface or the back focal length in this example are different from the optical data in the first example, and in this example, the object-side surface 21 of the second lens element 20 facing toward the object side 2 has a concave portion 23' in the vicinity of the optical axis, the image-side surface 22 of the second lens element 20 facing toward the image side 3 has a convex portion 26' in the vicinity of the optical axis and a convex portion 27' in a vicinity of its circular periphery.

The optical data of the second example of the optical imaging lens are shown in FIG. 20 while the aspheric surface data are shown in FIG. 21. In this example, the image height is 0.862 mm, EFL is 0.806 mm, HFOV is 85.190 degrees, TTL is 9.568 mm, and Fno is 2.28. In particular, the aberration of the second example is better than that of the first example of the present invention, the HFOV of the second example is larger than that of the first example, and the fabrication of the second example is easier than the first example so the yield is better. In addition, the optical imaging lens of the second embodiment has good focal shift performance, the focal shift is 0.000 mm at room temperature 20° C., and the focal shift is 0.002 mm at ambient temperature 50° C.

THIRD EXAMPLE

Figure 10:
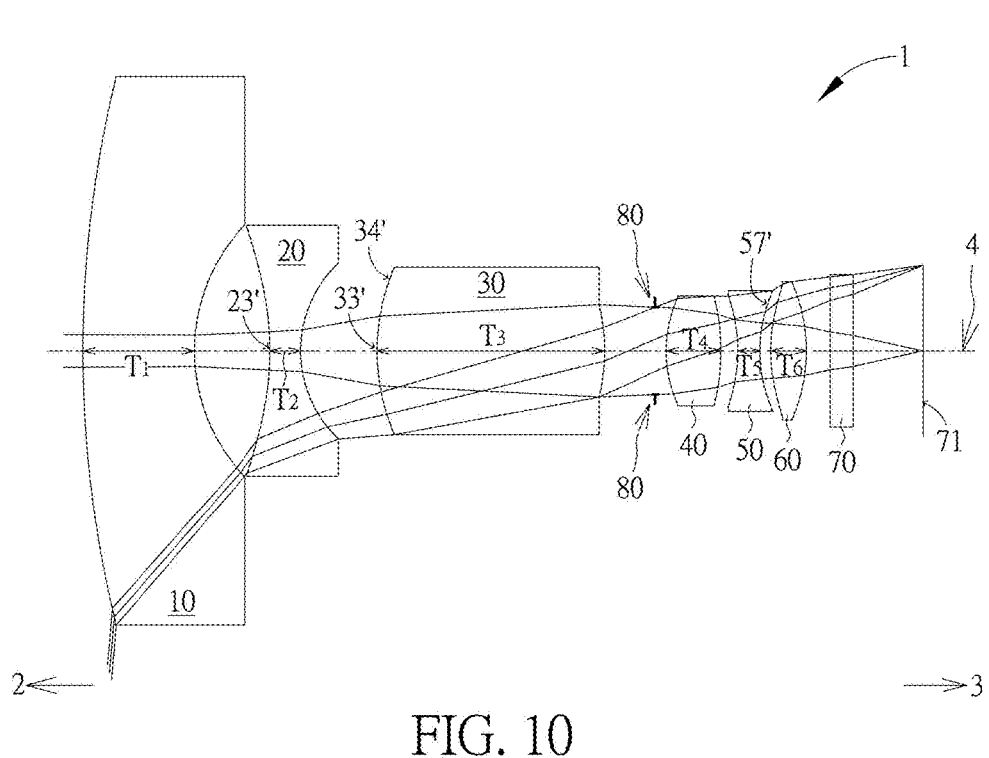
FIG. 10 illustrates a third example of the optical imaging lens set of six lens elements of the present invention.
Figures 11A, 11B, 11C, 11D:
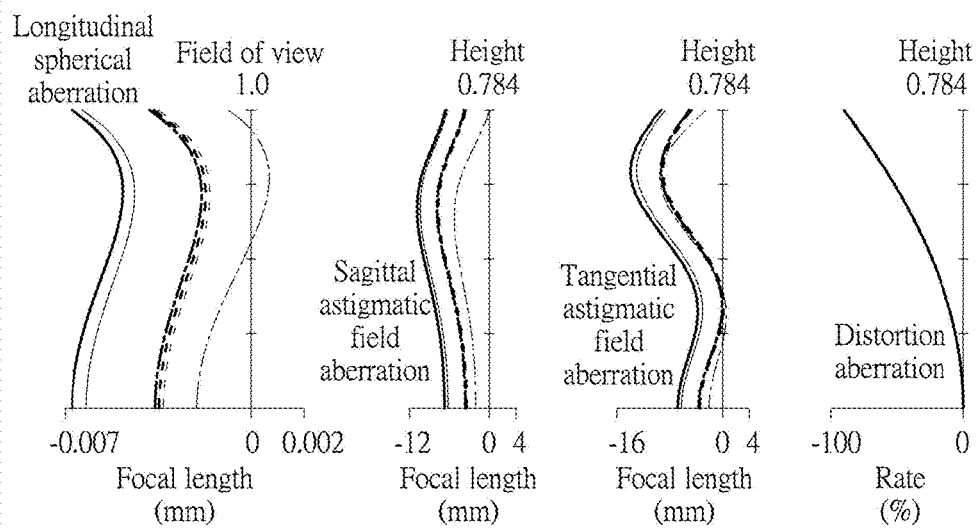
FIG. 11A illustrates the longitudinal spherical aberration of the third example.
FIG. 11B illustrates the astigmatic aberration on the sagittal direction of the third example.
FIG. 11C illustrates the astigmatic aberration on the tangential direction of the third example.
FIG. 11D illustrates the distortion aberration of the third example.

Please refer to FIG. 10 which illustrates the third example of the optical imaging lens 1 of the present invention. Please refer to FIG. 11A for the longitudinal spherical aberration on the image plane 71 of the third example; please refer to FIG. 11B for the astigmatic aberration on the sagittal direction; please refer to FIG. 11C for the astigmatic aberration on the tangential direction, and please refer to FIG. 11D for the distortion aberration. The components in the third example are similar to those in the first example, but the optical data such as the curvature radius, the refractive power, the lens thickness, the lens focal length, the aspheric surface or the back focal length in this example are different from the optical data in the first example, and in this example, the object-side surface 21 of the second lens element 20 facing toward the object side 2 has a concave portion 23' in the vicinity of the optical axis, the object-side surface 31 of the third lens element 30 facing toward the object side 2 has a convex portion 33' in the vicinity of the optical axis and a convex portion 34' in a vicinity of its circular periphery, the image-side surface 52 of the fifth lens element 50 facing toward the image side 3 has a concave portion 57' in the vicinity of its circular periphery.

The optical data of the third example of the optical imaging lens are shown in FIG. 22 while the aspheric surface data are shown in FIG. 23. In this example, the image height is 0.784 mm, EFL is 0.691 mm, HFOV is 85.046 degrees, TTL is 7.691 mm, and Fno is 2.28. In particular, the aberration of the third example is better than that of the first example of the present invention, the HFOV of the third example is larger than that of the first example, and the fabrication of the third example is easier than the first example so the yield is better. In addition, the optical imaging lens of the third embodiment has good focal shift performance, the focal shift is 0.000 mm at room temperature 20° C., and the focal shift is −0.001 mm at ambient temperature 50° C.

FOURTH EXAMPLE

Figure 12:
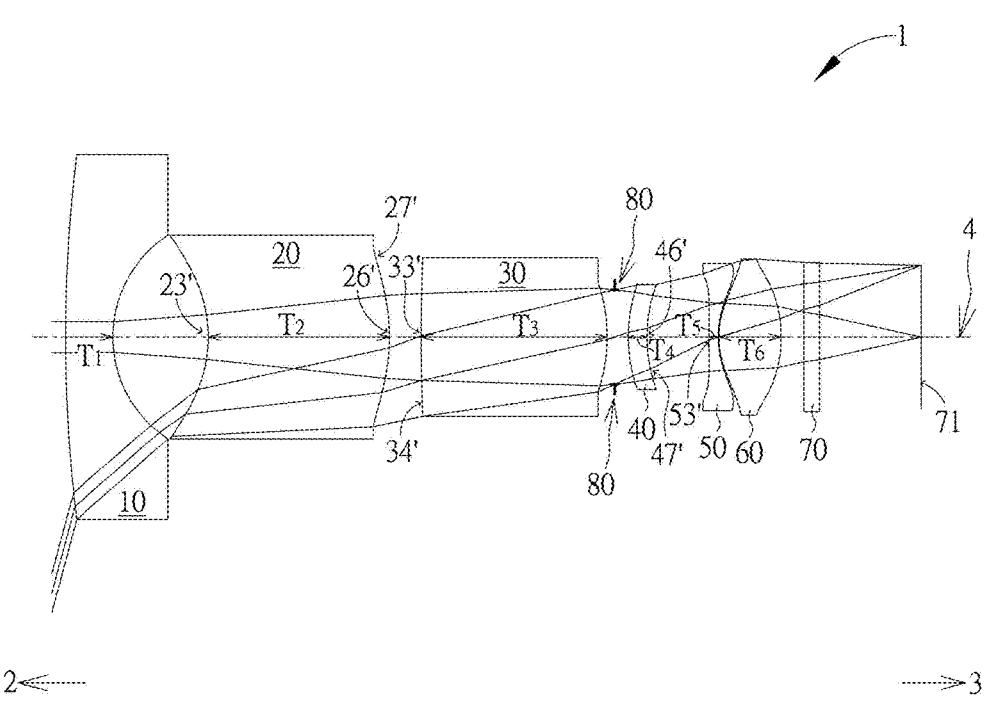
FIG. 12 illustrates a fourth example of the optical imaging lens set of six lens elements of the present invention.
Figures 13A, 13B, 13C, 13D:
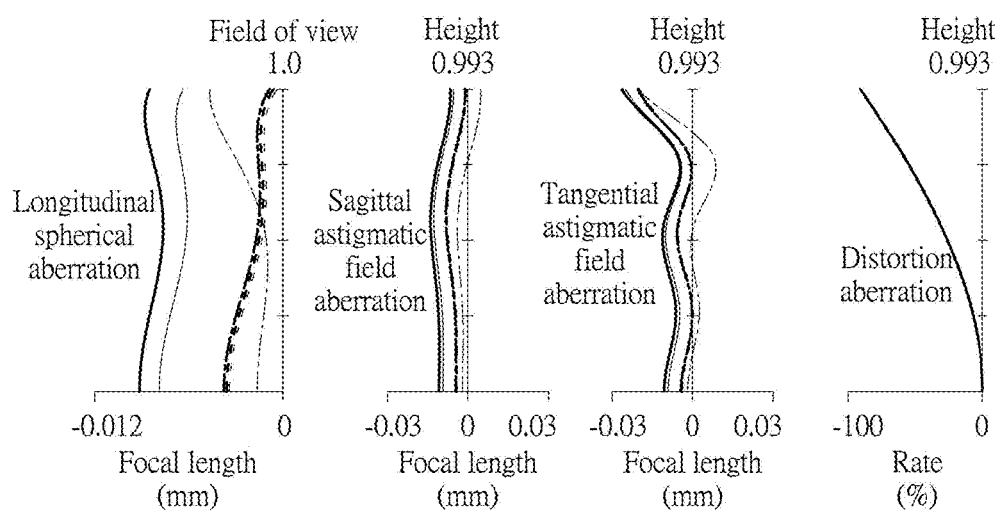
FIG. 13A illustrates the longitudinal spherical aberration of the fourth example.
FIG. 13B illustrates the astigmatic aberration on the sagittal direction of the fourth example.
FIG. 13C illustrates the astigmatic aberration on the tangential direction of the fourth example.
FIG. 13D illustrates the distortion aberration of the fourth example.

Please refer to FIG. 12 which illustrates the fourth example of the optical imaging lens 1 of the present invention. Please refer to FIG. 13A for the longitudinal spherical aberration on the image plane 71 of the fourth example; please refer to FIG. 13B for the astigmatic aberration on the sagittal direction; please refer to FIG. 13C for the astigmatic aberration on the tangential direction, and please refer to FIG. 13D for the distortion aberration. The components in the fourth example are similar to those in the first example, but the optical data such as the curvature radius, the refractive power, the lens thickness, the lens focal length, the aspheric surface or the back focal length in this example are different from the optical data in the first example, and in this example, the object-side surface 21 of the second lens element 20 facing toward the object side 2 has a concave portion 23' in the vicinity of the optical axis, the image-side surface 22 of the second lens element 20 facing toward the image side 3 has a convex portion 26' in the vicinity of the optical axis and a convex portion 27' in a vicinity of its circular periphery, the object-side surface 31 of the third lens element 30 facing toward the object side 2 has a convex portion 33' in the vicinity of the optical axis and a convex portion 34' in a vicinity of its circular periphery, the image-side surface 42 of the fourth lens element 40 facing toward the image side 3 has a concave portion 46' in the vicinity of the optical axis and a concave portion 47' in a vicinity of its circular periphery, and the object-side surface 51 of the fifth lens element 50 facing toward the object side 2 has a convex portion 53' in the vicinity of the optical axis.

The optical data of the fourth example of the optical imaging lens are shown in FIG. 24 while the aspheric surface data are shown in FIG. 25. In this example, the image height is 0.993 mm, EFL is 0.954 mm, HFOV is 85.050 degrees, TTL is 11.348 mm, and Fno is 2.28. In particular, the aberration of the fourth example is better than that of the first example of the present invention, the HFOV of the fourth example is larger than that of the first example, and the fabrication of the fourth example is easier than the first example so the yield is better. In addition, the optical imaging lens of the fourth embodiment has good focal shift performance, the focal shift is 0.000 mm at room temperature 20° C., and the focal shift is 0.019 mm at ambient temperature 50° C.

FIFTH EXAMPLE

Figure 14:
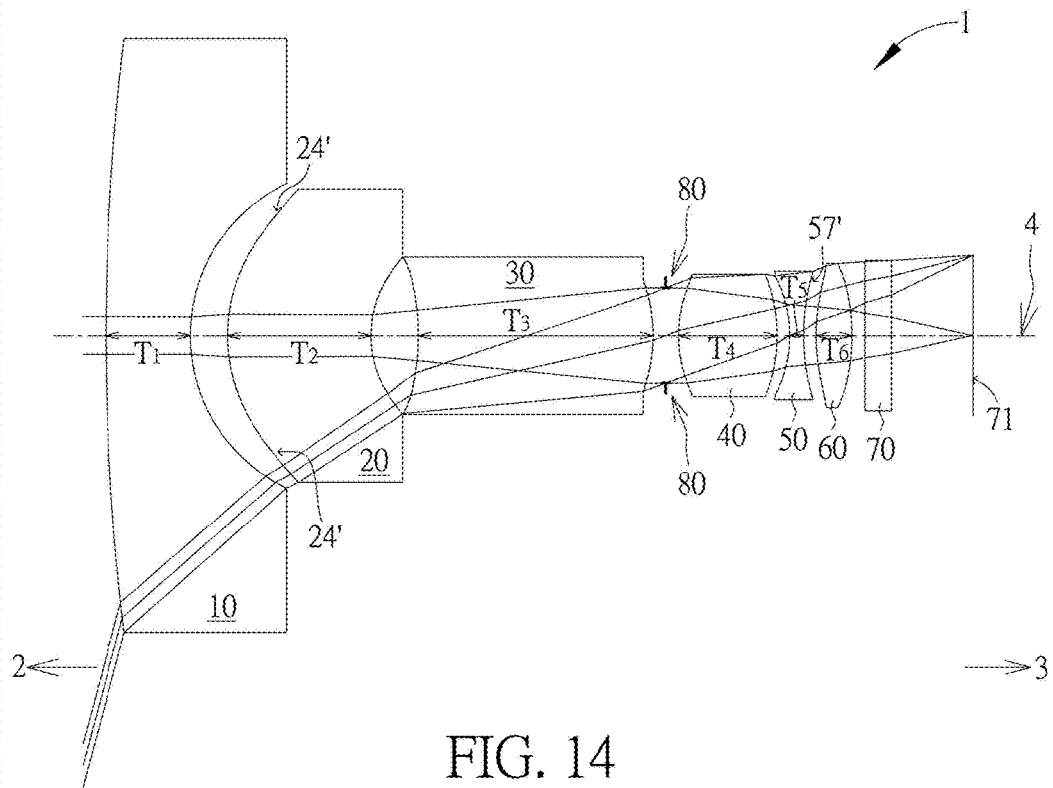
FIG. 14 illustrates a fifth example of the optical imaging lens set of six lens elements of the present invention.
Figures 15A, 15B, 15C, 15D:
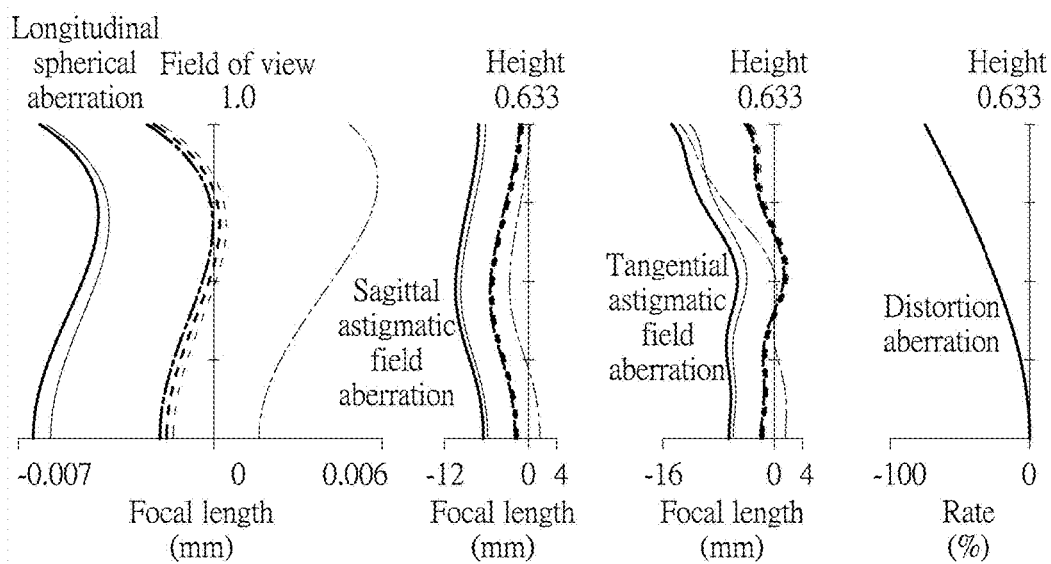
FIG. 15A illustrates the longitudinal spherical aberration of the fifth example.
FIG. 15B illustrates the astigmatic aberration on the sagittal direction of the fifth example.
FIG. 15C illustrates the astigmatic aberration on the tangential direction of the fifth example.
FIG. 15D illustrates the distortion aberration of the fifth example.

Please refer to FIG. 14 which illustrates the fifth example of the optical imaging lens 1 of the present invention. Please refer to FIG. 15A for the longitudinal spherical aberration on the image plane 71 of the fifth example; please refer to FIG. 15B for the astigmatic aberration on the sagittal direction; please refer to FIG. 15C for the astigmatic aberration on the tangential direction, and please refer to FIG. 15D for the distortion aberration. The components in the fifth example are similar to those in the first example, but the optical data such as the curvature radius, the refractive power, the lens thickness, the lens focal length, the aspheric surface or the back focal length in this example are different from the optical data in the first example, and in the fifth example, the object-side surface 21 of the second lens element 20 facing toward the object side 2 has a convex portion 24' in the vicinity of its periphery, and the image-side surface 52 of the fifth lens element 50 facing toward the image side 3 has a concave portion 57' in the vicinity of its periphery.

The optical data of the fifth example of the optical imaging lens are shown in FIG. 24 while the aspheric surface data are shown in FIG. 25. In this example, the image height is 0.633 mm, EFL is 0.686 mm, HFOV is 75.052 degrees, TTL is 6.830 mm, and Fno is 2.28. In particular, the aberration of the fifth example is better than that of the first example of the present invention, and the fabrication of the fifth example is easier than the first example so the yield is better. In addition, the optical imaging lens of the fifth embodiment has good focal shift performance, the focal shift is 0.000 mm at room temperature 20° C., and the focal shift is −0.002 mm at ambient temperature 50° C.

SIXTH EXAMPLE

Figure 16:
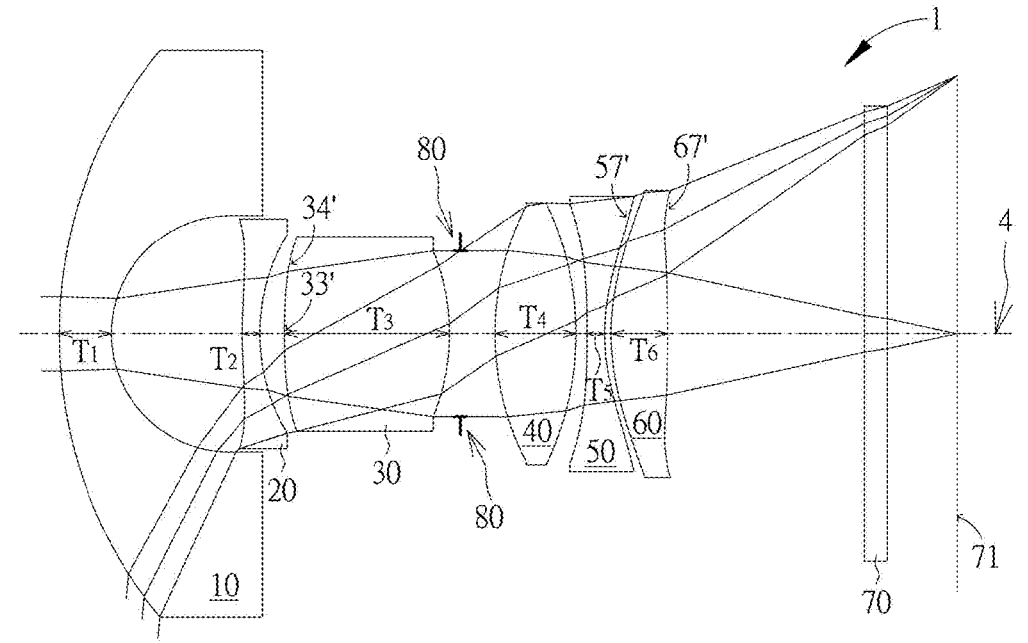
FIG. 16 illustrates a sixth example of the optical imaging lens set of six lens elements of the present invention.
Figures 17A, 17B, 17C, 17D:
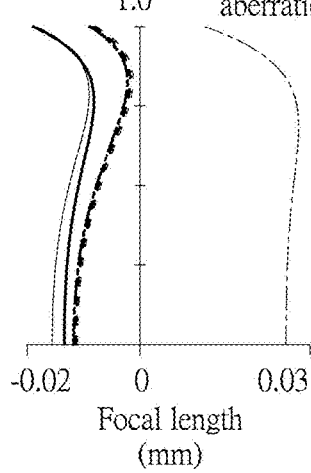
FIG. 17A illustrates the longitudinal spherical aberration of the sixth example.
FIG. 17B illustrates the astigmatic aberration on the sagittal direction of the sixth example.
FIG. 17C illustrates the astigmatic aberration on the tangential direction of the sixth example.
FIG. 17D illustrates the distortion aberration of the sixth example.

Please refer to FIG. 16 which illustrates the sixth example of the optical imaging lens 1 of the present invention. Please refer to FIG. 17A for the longitudinal spherical aberration on the image plane 71 of the sixth example; please refer to FIG. 17B for the astigmatic aberration on the sagittal direction; please refer to FIG. 17C for the astigmatic aberration on the tangential direction, and please refer to FIG. 17D for the distortion aberration. The components in the sixth example are similar to those in the first example, but the optical data such as the curvature radius, the refractive power, the lens thickness, the lens focal length, the aspheric surface or the back focal length in this example are different from the optical data in the first example, and in this example, the object-side surface 31 of the third lens element 30 facing toward the object side 2 has a convex portion 33' in the vicinity of the optical axis and a convex portion 34' in a vicinity of its circular periphery, the image-side surface 52 of the fifth lens element 50 facing toward the image side 3 has a concave portion 57' in the vicinity of its periphery, the image-side surface 62 of the sixth lens element 60 facing toward the image side 3 has a concave portion 67' in a vicinity of its circular periphery.

The optical data of the sixth example of the optical imaging lens are shown in FIG. 24 while the aspheric surface data are shown in FIG. 25. In this example, the image height is 2.333 mm, EFL is 1.596 mm, HFOV is 85.020 degrees, TTL is 8.210 mm, and Fno is 2.28. In particular, the aberration of the sixth example is better than that of the first example of the present invention, the HFOV of the sixth example is larger than that of the first example, and the fabrication of the sixth example is easier than the first example so the yield is better. In addition, the optical imaging lens of the sixth embodiment has good focal shift performance, the focal shift is 0.000 mm at room temperature 20° C., and the focal shift is −0.027 mm at ambient temperature 50° C.

Some important ratios in each example are shown in FIG. 30 and in FIG. 31.

In the light of the above examples, the inventors observe at least the following features of the lens arrangement of the present invention and the corresponding efficacy:

1. The first lens element has negative refractive power, to facilitate the design of an optical imaging lens with larger half field of view.
2. The second lens element has negative refractive, to facilitate the correction the aberration which is caused by the first lens element.
3. The fourth lens element has an object-side surface with a convex portion in a vicinity of the optical-axis, to help the collection of incoming light.
4. The image-side surface of the fifth lens element facing toward the image side has a concave portion in the vicinity of the optical axis, to facilitate the correction the aberration which is caused by the first lens element to the fourth lens element.
5. At least one lens element adjacent to the aperture stop has a positive refractive power and the material is made of glass, to help reduce the focal shift caused by the ambient temperature.
6. Except for the glass lens elements, other lens elements with refractive power are plastic lens elements that help to reduce manufacturing costs, and to achieve the requirements of lightweight.
7. If the condition of $|v2-v3|\leq15.000$ is satisfied, it can effectively reduce the optical lens chromatic aberration and improving the image quality, preferably, the range is between $0.000\leq|v2-v3|\leq15.000$.
8. According to the design mentioned above, the parameters are matched to each other, the total length of the optical imaging lens can be reduced, and having low focal shift indifferent ambient temperatures. Besides, the visible and the near infrared (NIR) dual band light can be imaged at the same position on the image plane with good image quality.

In addition, the inventors further discover that there are some better ratio ranges for different optical data according to the above various important ratios. Better optical ratio ranges help the designers to design a better optical performance and an effectively reduce length of a practically possible optical imaging lens set:

(a) To diminish the total length, the present invention proposes to reduce the lens thickness and air gaps between adjacent lens elements. Taking the assembly fabrication and imaging quality into consideration, the lens thickness and the air gaps should be coordinated with each other. The following conditions help the optical imaging lens set have better arrangement:

G12/G45≤12.000, preferably, the range is between 0.300≤G12/G45≤12.000;

T6/G45≤5.300, preferably, the range is between 0.300≤T6/G45≤5.300;

BFL/T1≤5.500, preferably, the range is between 1.000≤BFL/T1≤5.500;

AAG/T1≤5.000, preferably, the range is between 1.500≤AAG/T1≤5.000;

ALT/BFL≤5.300, preferably, the range is between 0.400≤ALT/BFL≤5.300.

(b) A smaller EFL helps enlarge the field angle, so the EFL is preferably smaller. The following conditions help the enlargement of the field angle in order to reduce the total length of the optical imaging lens set:

T3/EFL≤3.100, preferably, the range is between 0.100≤T3/EFL≤3.100;

ALT/EFL≤7.100, preferably, the range is between 0.700≤ALT/EFL≤7.100;

AAG/EFL≤3.200, preferably, the range is between 0.300≤AAG/EFL≤3.200.

(c) The optical parameters and the total length of the optical imaging lens set together keep a suitable range so the parameters are not so great to enlarge the total length of the optical imaging lens set or too small to fabricate.

TL/T1≤15.000, preferably, the range is between 6.500≤TL/T1≤15.000;

TTL/T3≤11.000, preferably, the range is between 3.700≤TTL/T3≤11.000;

TL/BFL≤6.200, preferably, the range is between 1.000≤TL/BFL≤6.200;

TTL/ALT≤2.300, preferably, the range is between 1.300≤TTL/ALT≤2.300;

TL/AAG≤5.500, preferably, the range is between 1.800≤TL/AAG≤5.500.

(d) By limiting the optical parameters and the second lens element thickness T2, the second lens element thickness T2 is not so large or so small to facilitate the reduction of the optical aberration cause by the first lens element.

G34/T2≤5.000, preferably, the range is between 0.100≤G34/T2≤5.000;

G23/T2≤2.500, preferably, the range is between 0.100≤G23/T2≤2.500.

(e) By limiting the optical parameters and the fourth lens element thickness T4, the fourth lens element thickness T4 is not so large or so small to facilitate the reduction of the optical aberration cause by the first lens element to the third lens element.

T4/G34≤10.000, preferably, the range is between 0.300≤T4/G34≤10.000;

T4/G45≤10.000, preferably, the range is between 0.300≤T4/G45≤10.000.

(f) By limiting the optical parameters and the fifth lens element thickness T5, the fifth lens element thickness T5 is not so large or so small to facilitate the reduction of the optical aberration cause by the first lens element to the fourth lens element.

G23/T5≤3.500, preferably, the range is between 1.200≤G23/T5≤3.500;

(T5+G56+T6)/G34≤3.900, preferably, the range is between 1.100≤(T5+G56+T6)/G34≤3.900.

In each one of the above examples, the longitudinal spherical aberration, the astigmatic aberration and the distortion aberration meet requirements in use. By observing three representative wavelengths of red, green and blue and three different wavelengths of near infrared, it is suggested that all curves of every wavelength are close to one another, which reveals off-axis light of different heights of every wavelength all concentrates on the image plane, and deviations of every curve also reveal that off-axis light of different heights are well controlled so the examples do improve the spherical aberration, the astigmatic aberration and the distortion aberration. In addition, by observing the imaging quality data the distances amongst the three representing different wavelengths (red, green and blue) and the three different wavelengths of near infrared are pretty close to one another, which means the present invention is able to concentrate light of the three representing different wavelengths so that the aberration is greatly improved. Given the above, the present invention provides outstanding imaging quality.

The above-mentioned one or more conditions may be optionally combined in the embodiments of the present invention to facilitate the design of the optical imaging lens of similar structure.

In the light of the unpredictability of the optical imaging lens, the present invention suggests the above principles to have a shorter total length of the optical imaging lens, a larger aperture available, better imaging quality or a better fabrication yield to overcome the drawbacks of prior art.

In addition to the above ratios, one or more conditional formulae may be optionally combined to be used in the embodiments of the present invention and the present invention is not limit to this. The curvatures of each lens element or multiple lens elements may be fine-tuned to result in more fine structures to enhance the performance or the resolution. For example, the object-side surface of the first lens element may additionally have a convex portion in the vicinity of the optical axis. The above limitations may be properly combined in the embodiments without causing inconsistency.

The max values or the min values of optional combinations of the above optical parameters are within the ranges of the present invention for the practice of the present invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical imaging lens, from an object side toward an image side in order along an optical axis comprising: a first lens element, a second lens element, a third lens element, a fourth lens element, a fifth lens element and a sixth lens element, said first lens element to said sixth lens element each having an object-side surface facing toward the object side as well as an image-side surface facing toward the image side, wherein:

said first lens element has negative refractive power;

said second lens element has negative refractive power;
said third lens element has positive refractive power;
said fourth lens element has an object-side surface with a convex portion in a vicinity of the optical axis; and
said fifth lens element has an image-side surface with a concave portion in a vicinity of the optical axis;
wherein, at least one lens element of the six lens elements disposed adjacent to an aperture stop has positive refractive power and made by glass material, except for the lens elements with glass material, other lens elements are plastic lens elements, the optical imaging lens exclusively has six lens elements with refractive power, the Abbe number of the second lens element is v2, the Abbe number of the third lens element is v3, G34 is an air gap between said third lens element and said fourth lens element along said optical axis, T4 is a thickness of said fourth lens element along said optical axis, an air gap is disposed between said fourth lens element and said fifth lens element, and the optical imaging lens satisfies the following condition: $|v2-v3| \leq 15.000$ and $T4/G34 \leq 10.000$.

2. The optical imaging lens of claim 1, wherein G12 is an air gap between said first lens element and said second lens element along said optical axis, G23 is an air gap between said second lens element and said third lens element along said optical axis, and the optical imaging lens satisfies the relationship: $G12/G45 \leq 12.000$.

3. The optical imaging lens of claim 1, wherein T2 is a thickness of said second lens element along said optical axis, and the optical imaging lens satisfies the relationship: $G34/T2 \leq 5.000$.

4. The optical imaging lens of claim 1, wherein G23 is an air gap between said second lens element and said third lens element along said optical axis, T2 is a thickness of said second lens element along said optical axis, and the optical imaging lens satisfies the relationship: $G23/T2 \leq 2.500$.

5. The optical imaging lens of claim 1, wherein G45 is an air gap between said fourth lens element and said fifth lens element along said optical axis, and the optical imaging lens satisfies the relationship: $T4/G45 \leq 10.000$.

6. The optical imaging lens of claim 1, wherein G23 is an air gap between said second lens element and said third lens element along said optical axis, T5 is a thickness of said fifth lens element along said optical axis, and the optical imaging lens satisfies the relationship: $G23/T5 \leq 3.500$.

7. The optical imaging lens of claim 1, wherein G45 is an air gap between said fourth lens element and said fifth lens element along said optical axis, T6 is a thickness of said sixth lens element along said optical axis, and the optical imaging lens satisfies the relationship: $T6/G45 \leq 5.300$.

8. The optical imaging lens of claim 1, wherein G56 is an air gap between said fifth lens element and said sixth lens element along said optical axis, T5 is a thickness of said fifth lens element along said optical axis, T6 is a thickness of said sixth lens element along said optical axis, and the optical imaging lens satisfies the relationship: $(T5+G56+T6)/G34 \leq 3.900$.

9. The optical imaging lens of claim 1, wherein the distance between the image-side surface of said sixth lens element and an image plane along said optical axis is BFL, T1 is a thickness of said first lens element along said optical axis, and the optical imaging lens satisfies the relationship: $BFL/T1 \leq 5.500$.

10. The optical imaging lens of claim 1, wherein AAG is a sum of all five air gaps between each lens elements from said first lens element to said sixth lens element along said optical axis, T1 is a thickness of said first lens element along said optical axis, and the optical imaging lens satisfies the relationship: $AAG/T1 \leq 5.000$.

11. The optical imaging lens of claim 1, wherein the distance from said object-side surface of said first lens element to said image-side surface of said sixth lens element along said optical axis is TL, T1 is a thickness of said first lens element along said optical axis, and the optical imaging lens satisfies the relationship: $TL/T1 \leq 15.000$.

12. The optical imaging lens of claim 1, wherein TTL is a distance from said object-side surface of said first lens element to an image plane, T3 is a thickness of said third lens element along said optical axis, and the optical imaging lens satisfies the relationship: $TTL/T3 \leq 11.000$.

13. The optical imaging lens of claim 1, wherein EFL is an effective focal length of the optical imaging lens, T3 is a thickness of said third lens element along said optical axis, and the optical imaging lens satisfies the relationship: $T3/EFL \leq 3.100$.

14. The optical imaging lens of claim 1, wherein ALT is a total thickness of all six lens elements along said optical axis, the distance between the image-side surface of said sixth lens element and an image plane along said optical axis is BFL, and the optical imaging lens satisfies the relationship: $ALT/BFL \leq 5.300$.

15. The optical imaging lens of claim 1, wherein the distance from said object-side surface of said first lens element to said image-side surface of said sixth lens element along said optical axis is TL, the distance between the image-side surface of said sixth lens element and an image plane along said optical axis is BFL, and the optical imaging lens satisfies the relationship: $TL/BFL \leq 6.200$.

16. The optical imaging lens of claim 1, wherein TTL is a distance from said object-side surface of said first lens element to an image plane, ALT is a total thickness of all six lens elements along said optical axis, and the optical imaging lens satisfies the relationship: $TTL/ALT \leq 2.300$.

17. The optical imaging lens of claim 1, ALT is a total thickness of all six lens elements along said optical axis, EFL is an effective focal length of the optical imaging lens, and the optical imaging lens satisfies the relationship: $ALT/EFL \leq 7.100$.

18. The optical imaging lens of claim 1, wherein the distance from said object-side surface of said first lens element to said image-side surface of said sixth lens element along said optical axis is TL, AAG is a sum of all five air gaps between each lens elements from said first lens element to said sixth lens element along said optical axis, and the optical imaging lens satisfies the relationship: $TL/AAG \leq 5.500$.

19. The optical imaging lens of claim 1, wherein AAG is a sum of all five air gaps between each lens elements from said first lens element to said sixth lens element along said optical axis, EFL is an effective focal length of the optical imaging lens, and the optical imaging lens satisfies the relationship: $AAG/EFL \leq 3.200$.

* * * * *